US012789996B2

(12) United States Patent
Cassou

(10) Patent No.: US 12,789,996 B2
(45) Date of Patent: Nov. 10, 2026

(54) RETRACTABLE BIN CONTOURED CLASS DIVIDER

(71) Applicant: The Boeing Company, Arlington, VA (US)

(72) Inventor: Kevin LeRoy Cassou, Everett, WA (US)

(73) Assignee: THE BOEING COMPANY, Arlington, VA (US)

( * ) Notice: Subject to any disclaimer, the term of this patent is extended or adjusted under 35 U.S.C. 154(b) by 195 days.

(21) Appl. No.: 18/471,467

(22) Filed: Sep. 21, 2023

(65) Prior Publication Data

US 2025/0100686 A1 Mar. 27, 2025

(51) Int. Cl.
*B64D 11/00* (2006.01)

(52) U.S. Cl.
CPC ........ *B64D 11/0023* (2013.01); *B64D 11/003* (2013.01)

(58) Field of Classification Search
CPC .......................... B64D 11/0023; B64D 11/003
See application file for complete search history.

(56) References Cited

U.S. PATENT DOCUMENTS

| | | | | |
|---|---|---|---|---|
| 7,530,529 B2 * | 5/2009 | Bock | B64D 11/0023 | 244/118.5 |
| 8,118,258 B2 * | 2/2012 | Mosler | B64D 11/0023 | 244/118.5 |
| 8,336,257 B2 * | 12/2012 | McDonald | E04B 1/043 | 49/306 |
| 8,814,088 B2 * | 8/2014 | Burrows | B64D 11/003 | 244/118.5 |
| 8,814,089 B2 * | 8/2014 | Chandler | B64D 11/0023 | 244/118.5 |
| 10,029,778 B2 * | 7/2018 | Telmos | B64D 11/00 | |
| 10,625,860 B2 * | 4/2020 | Rafler | B64D 11/0023 | |

FOREIGN PATENT DOCUMENTS

WO WO-2013142660 A1 * 9/2013 ......... B64D 11/0023

* cited by examiner

*Primary Examiner* — Richard Green

(74) *Attorney, Agent, or Firm* — COATS & BENNETT, PLLC

(57) ABSTRACT

Apparatuses, systems, and methods for a multi-section vehicle cabin partition are disclosed comprising a movable partition section movable between deployed and stowed partition section configurations that maintains contact with an overhead vehicle cabin storage bin assembly during storage bin access to provide continual sight-blocking and light-blocking partitioning of vehicle cabin areas.

20 Claims, 15 Drawing Sheets

FIG. 1
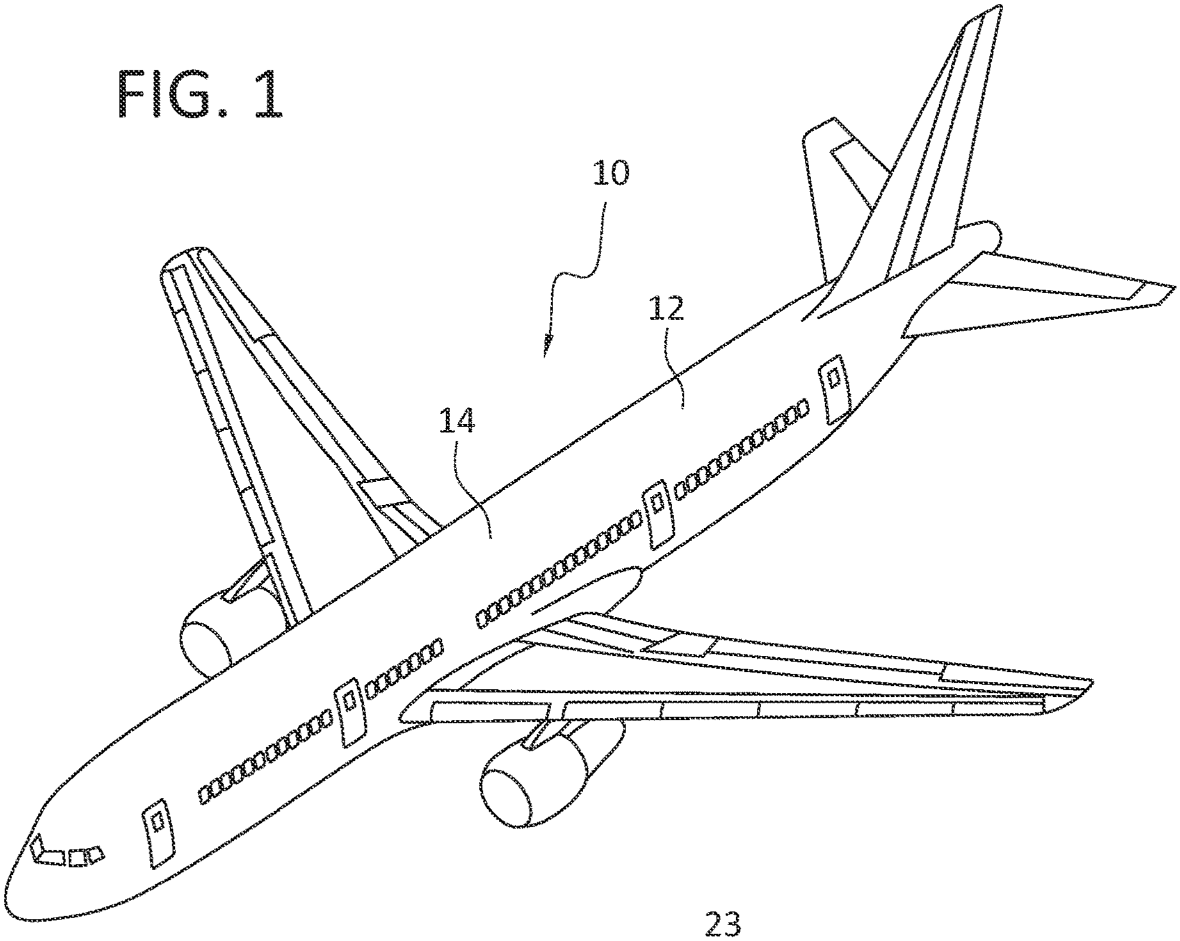
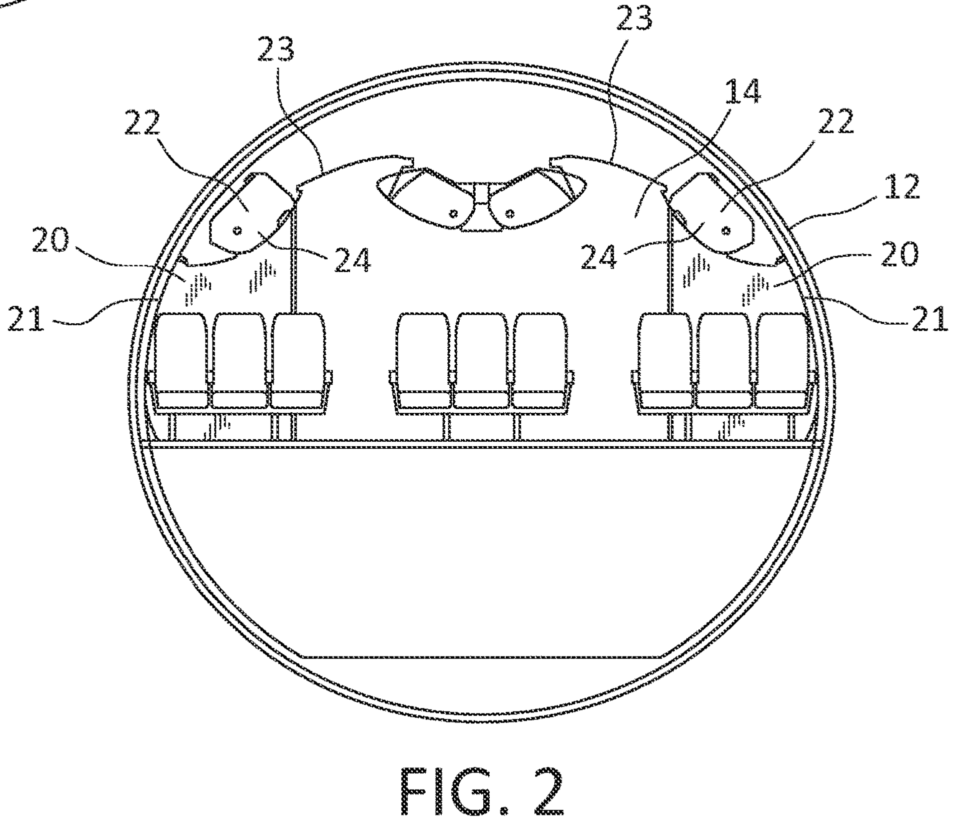
FIG. 2

RETRACTABLE BIN CONTOURED CLASS DIVIDER

TECHNOLOGICAL FIELD

The present disclosure relates generally to the field of vehicle cabin configurations. More specifically the present disclosure relates to the field of vehicle cabin partition walls and/or cabin compartment dividers.

BACKGROUND

Vehicle cabins typically comprise differing cabin regions or cabin "classes" or cabin "class sections" (e.g., first class, business class, economy class, etc.) that are denoted or otherwise marked or separated from one another through the positioning of various partitions that can be fixed or temporary partitions (e.g., walls, curtains, etc.). The borders of adjacent and varying types of vehicle classes can occur at or near cabin structures that ordinarily move (e.g., overhead storage bins, etc.), and class partitions may be installed at cabin regions that can frustrate the unfettered use of certain cabin structures or render the cabin structures useless due to the positioning of the class partitions.

Unless explicitly identified as such, no statement herein is admitted as prior art merely by its inclusion in the Technological Field and/or Background section.

SUMMARY

Present aspects are directed to multi-section vehicle cabin partitions that can change their height while maintaining partition sight-blocking and partition light-blocking capabilities, but that accommodate entry into overhead storage bins that are located proximate to the partition, and where such overhead vehicle cabin storage bins would otherwise be rendered inaccessible due to the positioning of the partition.

Present aspects are directed to a vehicle cabin partition assembly including a movable first partition section, and a second partition section that is a stationary second partition section, with the second partition section including a second partition section cavity, with the second partition section cavity including a second partition section cavity dimension that is at least partially bounded by a second partition cavity wall. The movable first partition section includes a movable first partition section dimension that is configured to be substantially received completely into the second partition section cavity in a movable first partition section stowed position. The movable first partition section is configured to move vertically relative to the second partition section between a movable first partition section deployed position and the movable first partition section stowed position.

In another aspect, the vehicle cabin partition assembly further comprises a linkage assembly including a linkage assembly in communication with a storage bin assembly that is positioned over the vehicle cabin partition assembly with the linkage assembly further in communication with the movable first partition section. The linkage assembly includes a linkage assembly first end in communication with a movable overhead storage bin door of an overhead storage bin assembly, with the overhead storage bin door including an overhead storage bin door surface contour, and with the linkage assembly further comprising a linkage assembly second end in communication with the movable first partition section, and wherein the movable first partition section is configured to move within the second partition section cavity between a movable first partition section deployed position and a movable first partition section stowed position.

In another aspect, the linkage assembly further includes a linkage assembly arm, with the linkage assembly arm extending from and in communication with the linkage assembly first end, and with the linkage assembly arm further extending to and in communication with the linkage assembly second end.

In another aspect, the vehicle cabin partition assembly further includes a locking mechanism configured to lock into place the movable first partition section in the movable first partition section deployed position, with the locking mechanism further configured to release the movable first partition section from the deployed position.

In another aspect, the vehicle cabin partition assembly includes a spring assembly comprising a spring-loaded mechanism at least partially located within the second partition section cavity.

In another aspect, the vehicle cabin partition assembly further includes a drive assembly, with the drive assembly in communication with the movable first partition section, with the drive assembly configured to move the movable first partition section within the second partition section cavity between a movable first partition section deployed position and a movable first partition section stowed position, with the drive assembly in communication with the movable first partition section, and with the drive assembly at least partially housed within the second partition section cavity.

In another aspect, the drive assembly includes a drive mechanism, with the drive mechanism including at least one of a pneumatic-driven mechanism, a hydraulic-driven mechanism, and an electrically motorized mechanism including a screw-driven mechanism.

In another aspect, the movable first partition section includes a movable first partition section including a movable first partition section upper edge contour dimensioned to substantially match the overhead storage bin door surface contour.

In a further aspect, the upper edge contour of the movable first partition section includes an upper edge contour seal disposed along a length of the upper edge contour, with the upper edge contour seal configured to substantially completely contact the vehicle cabin overhead storage bin door contour when the movable first partition section is in the movable first partition section deployed configuration.

In another aspect, the upper edge contour of the movable first partition section includes an upper edge contour seal disposed along a length of the upper edge contour, with the upper edge contour seal configured to substantially completely contact the vehicle cabin overhead storage bin door surface contour when the movable first partition section is in the movable first partition section stowed configuration.

Another present aspect is directed to a vehicle cabin, that can be an aircraft cabin, with the vehicle cabin including a vehicle cabin partition assembly including a movable first partition section, and a second partition section that is a stationary second partition section, with the second partition section including a second partition section cavity, with the second partition section cavity including a second partition section cavity dimension that is at least partially bounded by a second partition cavity wall. The movable first partition section includes a movable first partition section dimension that is configured to be substantially received completely into the second partition section cavity in a movable first partition section stowed position. The movable first partition section is configured to move vertically relative to the second partition section between a movable first partition section deployed position and the movable first partition section stowed position.

Another present aspect is directed to a vehicle, with the vehicle including a vehicle cabin partition assembly including a movable first partition section, and a second partition section that is a stationary second partition section, with the second partition section including a second partition section cavity, with the second partition section cavity including a second partition section cavity dimension that is at least partially bounded by a second partition cavity wall. The movable first partition section includes a movable first partition section dimension that is configured to be substantially received completely into the second partition section cavity in a movable first partition section stowed position. The movable first partition section is configured to move vertically relative to the second partition section between a movable first partition section deployed position and the movable first partition section stowed position.

Another present aspect is directed to an aircraft, with the aircraft including a vehicle cabin partition assembly including a movable first partition section, and a second partition section that is a stationary second partition section, with the second partition section including a second partition section cavity, with the second partition section cavity including a second partition section cavity dimension that is at least partially bounded by a second partition cavity wall. The movable first partition section includes a movable first partition section dimension that is configured to be substantially received completely into the second partition section cavity in a movable first partition section stowed position. The movable first partition section is configured to move vertically relative to the second partition section between a movable first partition section deployed position and the movable first partition section stowed position.

Another present aspect is directed to an apparatus for separating vehicle cabin sections, with the apparatus including a partition assembly, with the partition assembly including a movable first partition section including a movable first partition section upper edge contour, and a pocketed second partition section, with the pocketed second partition section including a pocketed second partition section cavity dimensioned to substantially completely receive the movable first partition section into the pocketed second partition section cavity. The apparatus further includes a vehicle cabin overhead storage bin assembly positioned above the partition assembly, with the vehicle cabin overhead storage bin assembly including a vehicle cabin overhead storage bin door that includes a vehicle cabin overhead storage bin door surface contour.

In another aspect, the movable first partition section is configured to move between a movable first partition section deployed position and a movable first partition section stowed position.

In another aspect, the movable first partition section upper edge contour is configured to contact the vehicle cabin overhead storage bin door surface contour in the movable first partition section deployed position.

In another aspect, the movable first partition section upper edge contour is configured to remain in contact with the vehicle cabin overhead storage bin door surface contour both in the movable first partition section deployed position and in the movable first partition section stowed position.

The apparatus further includes a linkage assembly comprising a linkage assembly first end in communication with a movable storage bin door of a vehicle overhead storage bin assembly, with the linkage assembly further including a linkage assembly second end in communication with the movable first partition section, and with the linkage assembly further including a linkage assembly arm extending from and in communication with the linkage assembly first end, with the linkage assembly arm further extending to and in communication with the linkage assembly second end.

In another aspect, the movable first partition section is configured to move vertically in relation to the second partition section and within the second partition section cavity between a movable first partition section deployed position and a movable first partition section stowed configuration.

In another aspect, the movable first partition section upper edge contour is configured to remain in contact with the vehicle cabin overhead storage bin door surface contour in both the movable first partition section deployed position and the movable first partition section stowed configuration.

In another aspect, the movable first partition section upper edge contour further includes an upper edge contour seal configured to substantially cover the movable first partition section upper edge contour.

A further present aspect is directed to a vehicle comprising an apparatus for separating vehicle cabin sections, with the apparatus including a partition assembly, with the partition assembly including a movable first partition section including a movable first partition section upper edge contour, and a pocketed second partition section, with the pocketed second partition section including a pocketed second partition section cavity dimensioned to substantially completely receive the movable first partition section into the pocketed second partition section cavity. The apparatus further includes a vehicle cabin overhead storage bin assembly positioned above the partition assembly, with the vehicle cabin overhead storage bin assembly including a vehicle cabin overhead storage bin door that includes a vehicle cabin overhead storage bin door surface contour.

Another aspect is directed to an aircraft comprising an apparatus for separating vehicle cabin sections, with the apparatus including a partition assembly, with the partition assembly including a movable first partition section including a movable first partition section upper edge contour, and a pocketed second partition section, with the pocketed second partition section including a pocketed second partition section cavity dimensioned to substantially completely receive the movable first partition section into the pocketed second partition section cavity. The apparatus further includes a vehicle cabin overhead storage bin assembly positioned above the partition assembly, with the vehicle cabin overhead storage bin assembly including a vehicle cabin overhead storage bin door that includes a vehicle cabin overhead storage bin door surface contour.

Another present aspect is directed to a method for altering a vehicle cabin partition height during vehicle cabin storage bin access, with the method including attaching a multi-section vehicle cabin partition assembly to a vehicle cabin overhead storage bin door of a vehicle cabin overhead storage bin, with the vehicle cabin overhead storage bin including a vehicle cabin overhead storage bin door contour. The multi-section vehicle cabin partition includes a movable first partition section, with the movable first partition section including a movable first partition dimension, and with the movable first partition section configured to move between a movable first partition section deployed position and a movable first partition section stowed position. The multi-section vehicle cabin partition further includes a second partition section, with the second partition section including a second partition section cavity, with the second partition section cavity including a second partition section cavity dimension, and with the second partition section cavity dimension at least partially bounded by a second partition section cavity wall. The movable first partition section dimension is configured to be substantially received completely into the second partition section cavity in the movable first partition section stowed position. The method further includes moving the movable first partition section between a movable first partition section deployed position and a movable first partition section stowed position, and altering the vehicle cabin partition height during vehicle cabin storage bin access.

In another aspect, the movable first partition section dimension further includes a movable first partition section upper edge contour, and a method further includes maintaining contact between the vehicle cabin overhead storage bin door contour and the movable first partition section upper edge contour in the movable first partition section deployed position.

In another aspect, the movable first partition section dimension further includes a movable first partition section upper edge contour, and a method further includes maintaining contact between the vehicle cabin overhead storage bin door contour and the movable first partition section upper edge contour both in the movable first partition section deployed position and in the movable first partition section stowed position.

In another aspect, a method further includes attaching the vehicle cabin overhead storage bin door of the vehicle cabin overhead storage bin to the movable first partition section via a linkage assembly. The linkage assembly comprising a linkage assembly first end in communication with a movable overhead storage bin door of an overhead storage bin assembly, with the overhead storage bin assembly including an overhead storage bin door having, an overhead storage bin door surface contour, and with the linkage assembly further includes a linkage assembly second end in communication with the movable first partition section.

The linkage assembly further includes a linkage assembly arm. The linkage assembly arm extends from and is in communication with the linkage assembly first end, with the linkage assembly arm further extending to and in communication with the linkage assembly second end.

In another aspect, a method further includes impeding the passage of light between the vehicle cabin overhead storage bin door surface contour and the first partition section upper edge contour both in the movable first partition section deployed position and in the movable first partition section stowed position.

In another aspect, a method further includes activating a drive mechanism positioned within the second partition section cavity, with the drive assembly configured to raise and lower the movable first partition section relative to the second partition section.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 3:
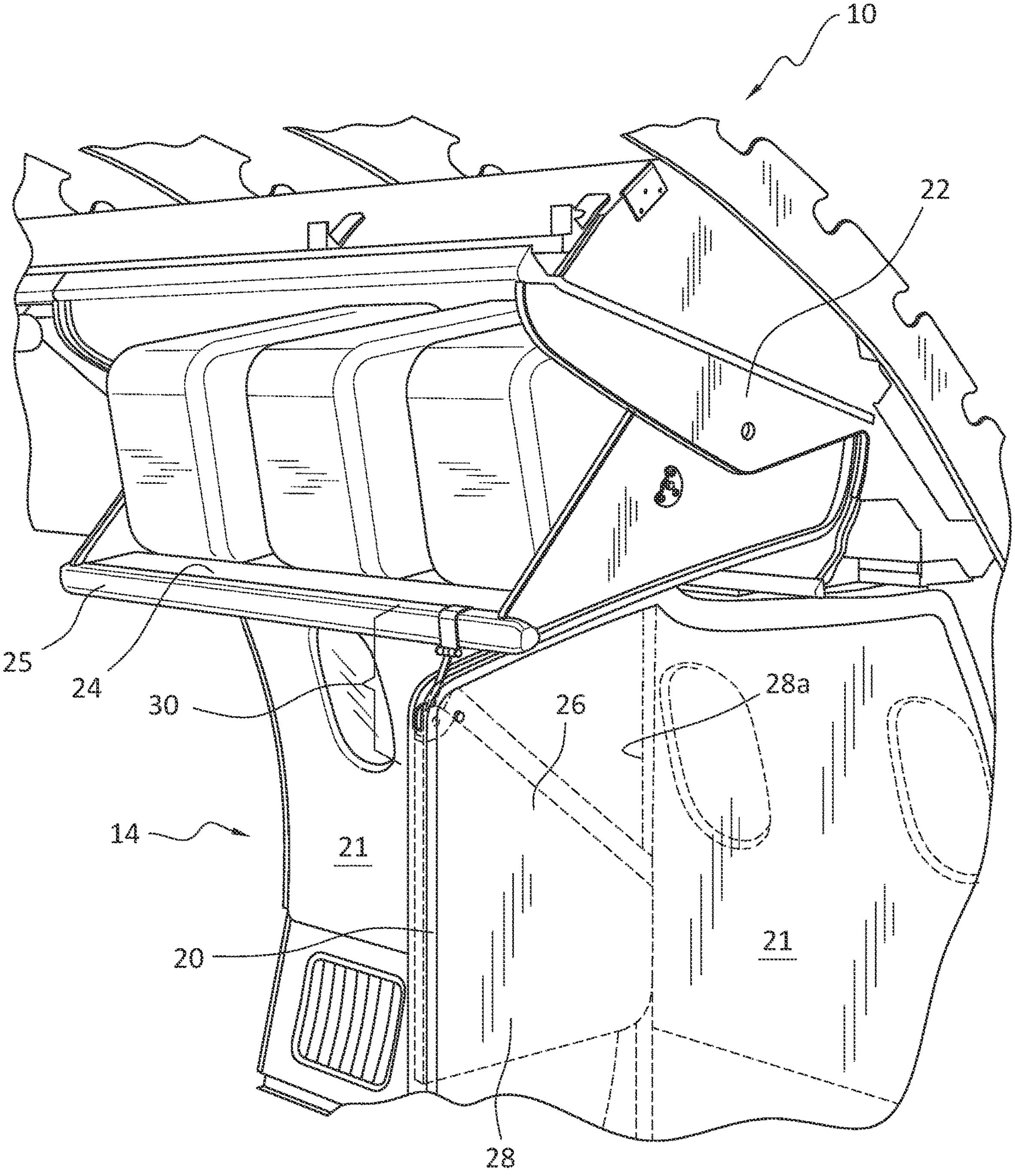
Figure 4:
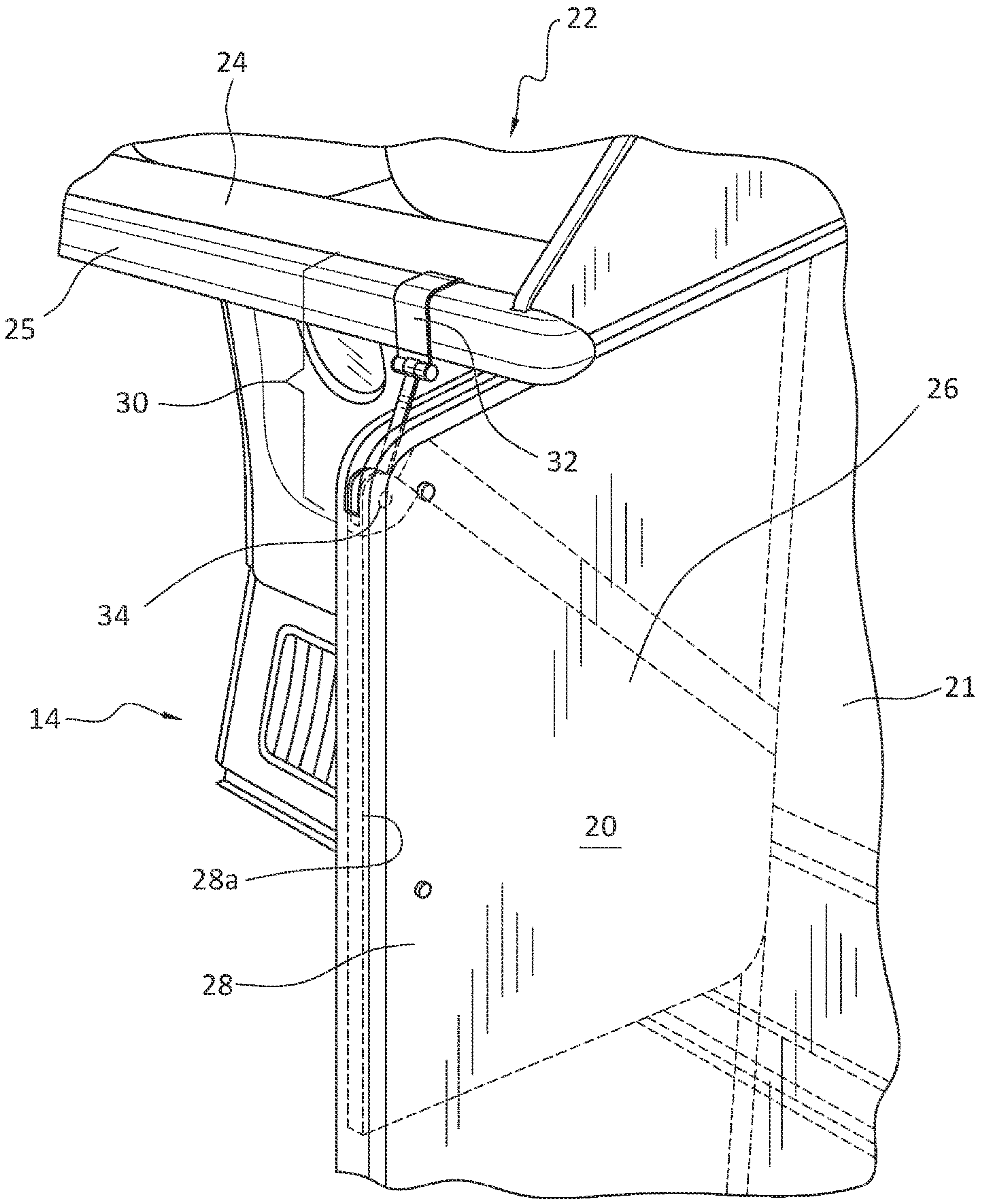
Figure 5:
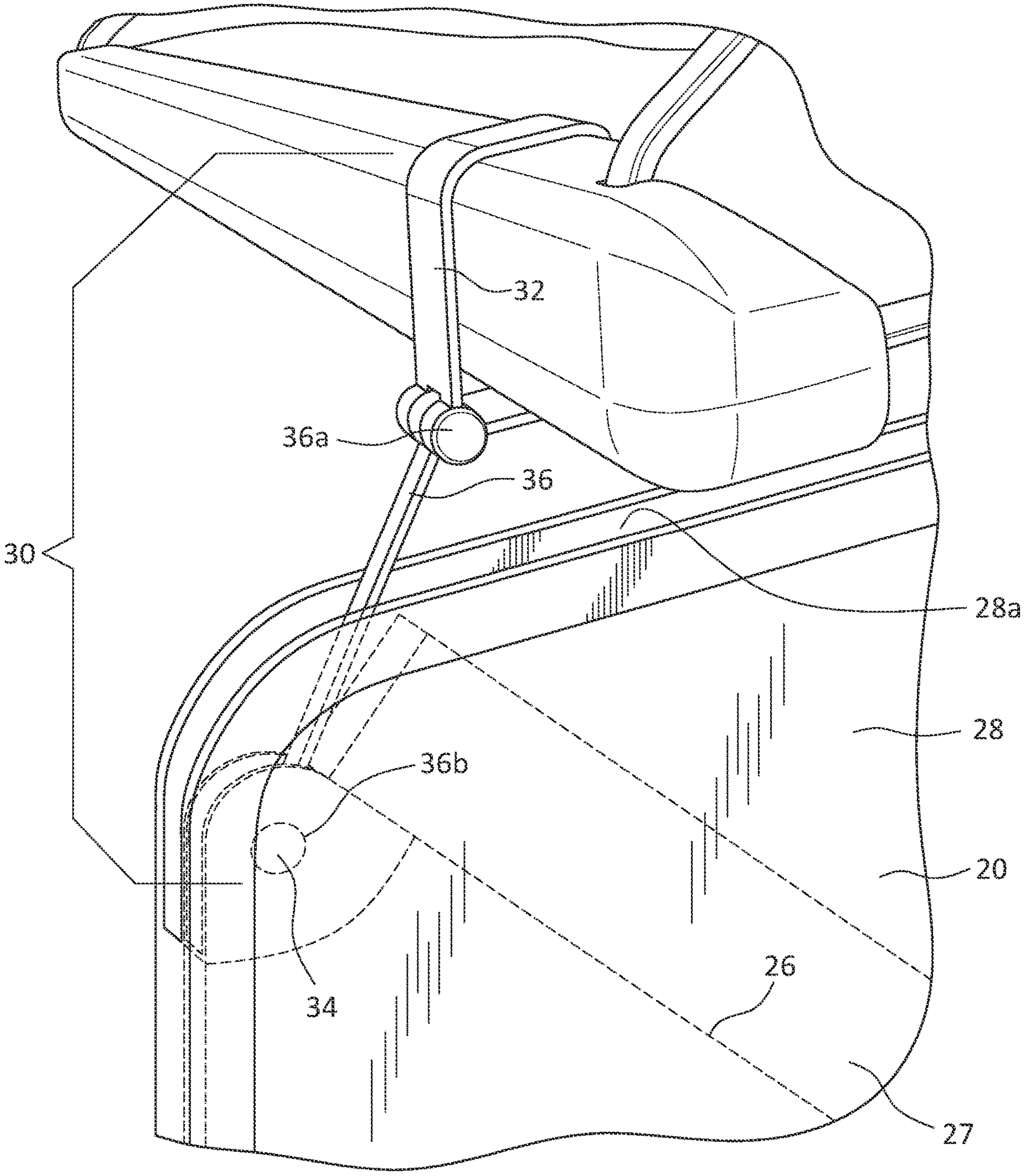
Figure 6:
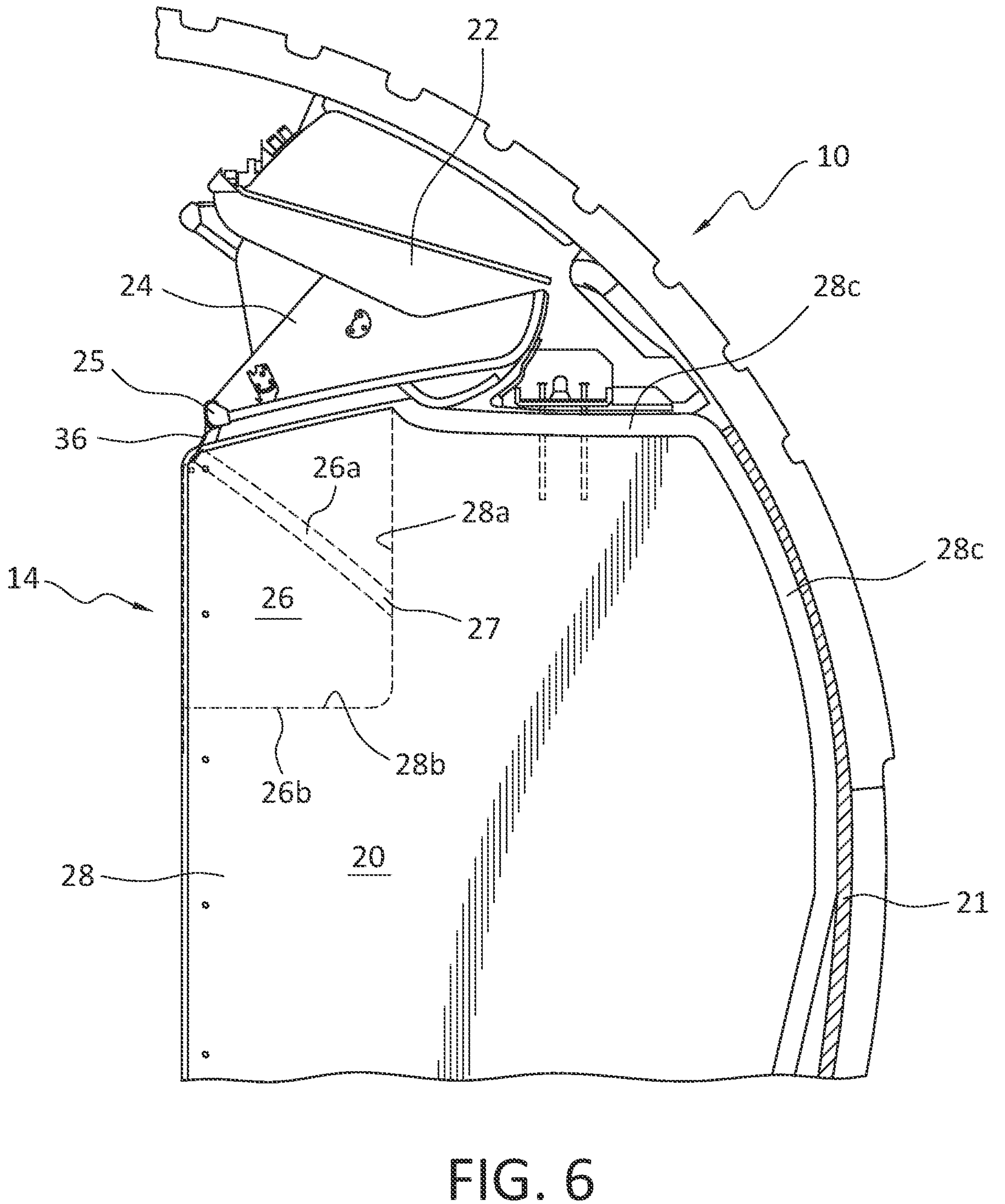
Figure 7:
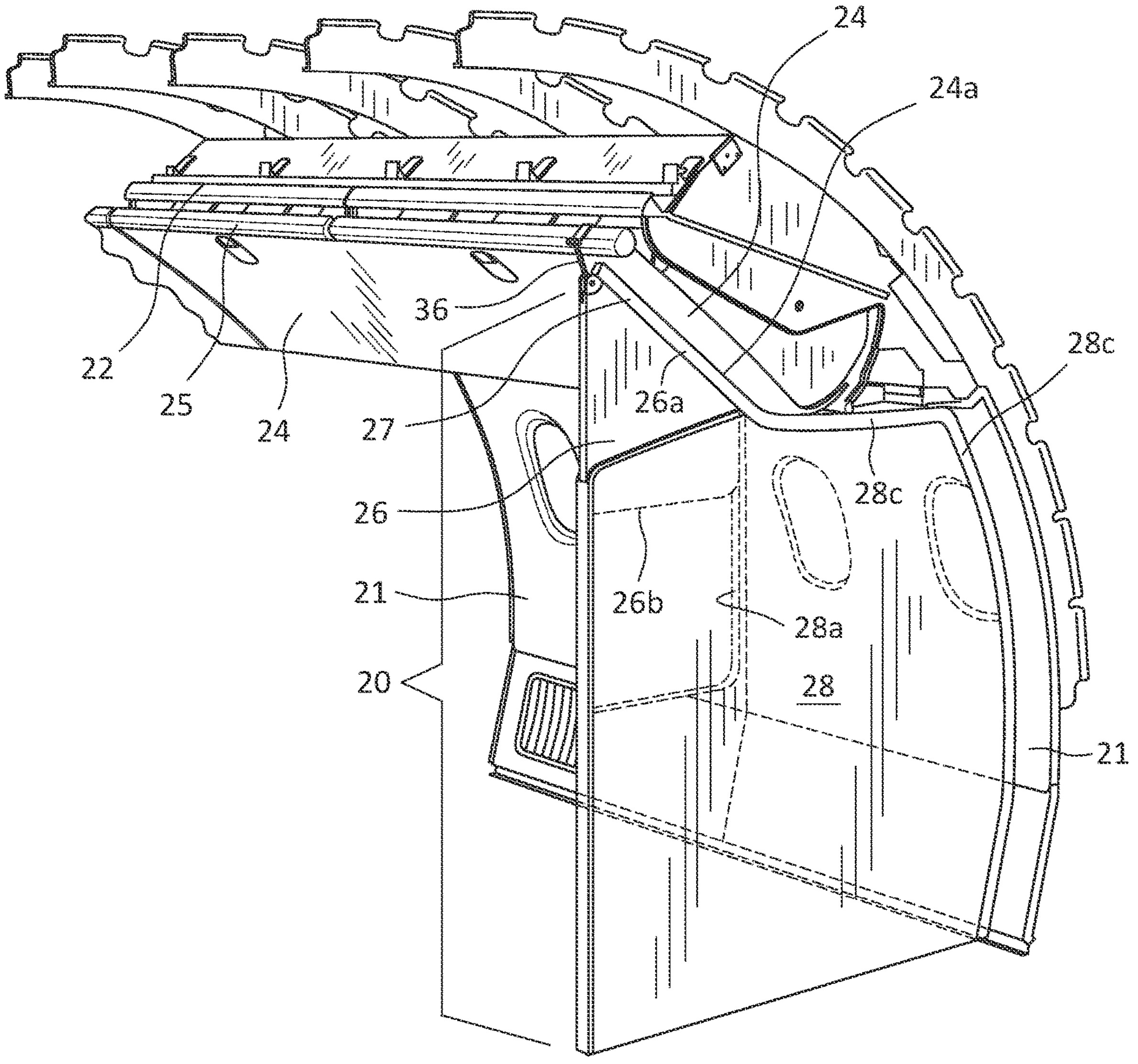
Figure 8:
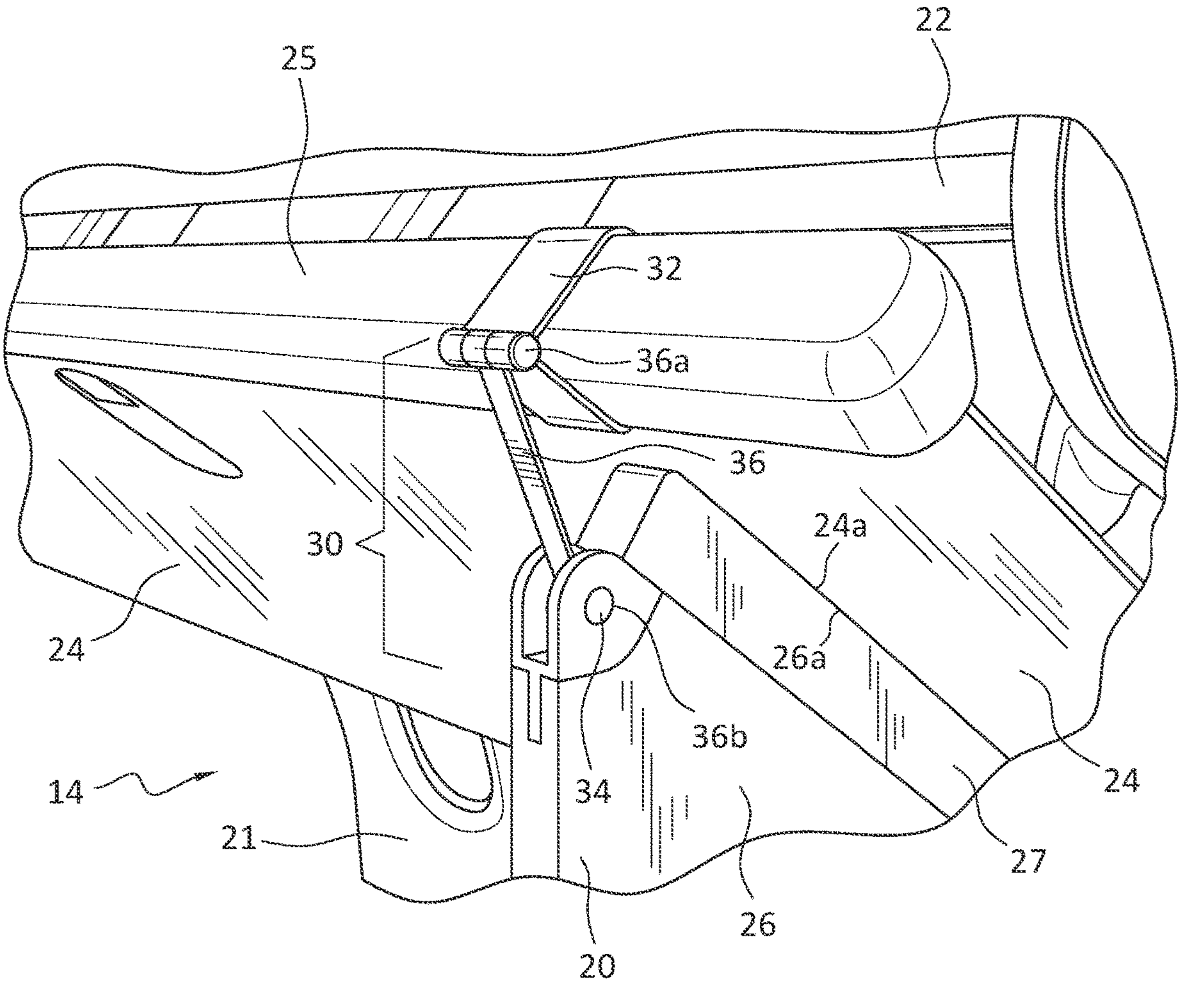
Figure 9:
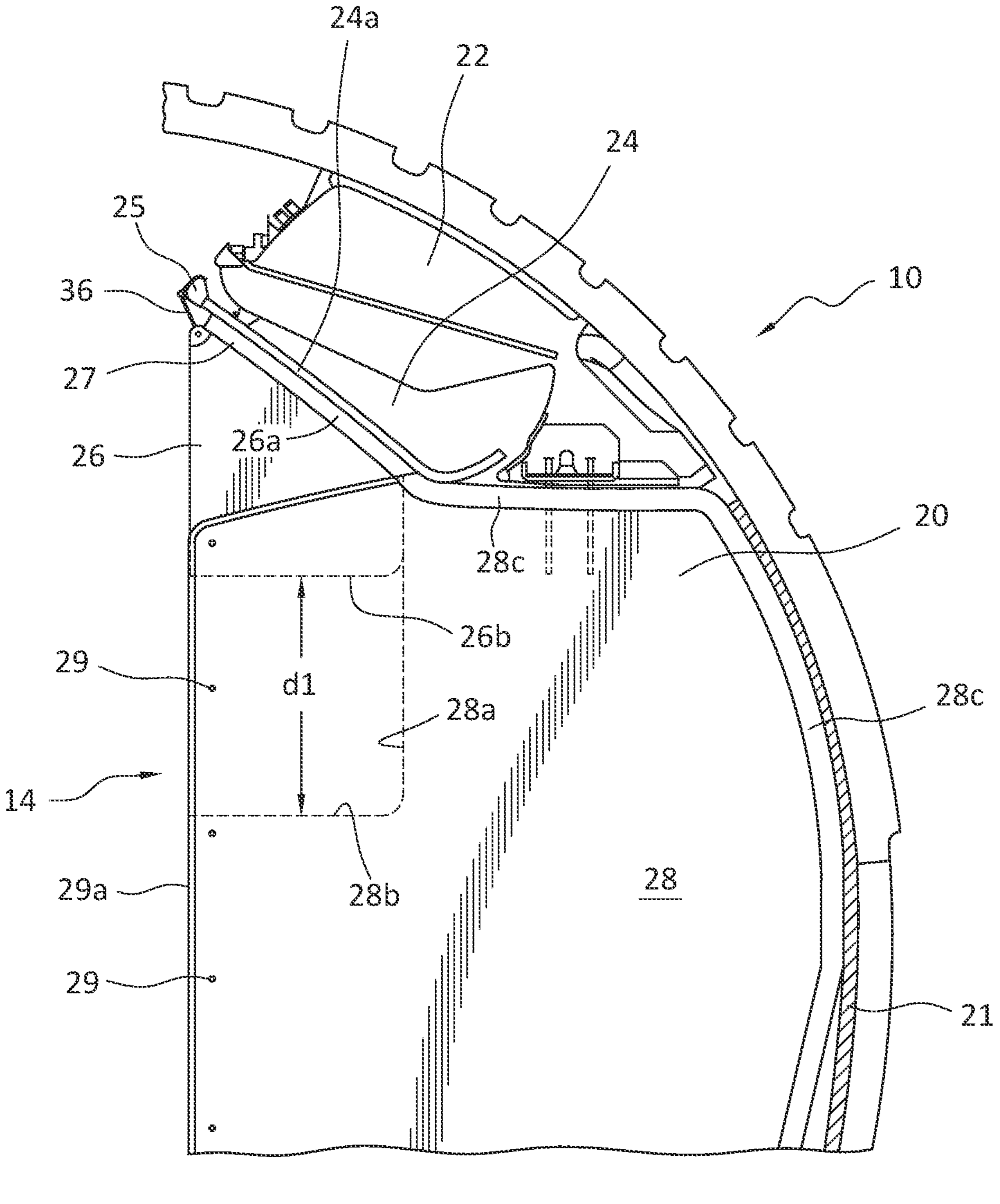
Figure 10:
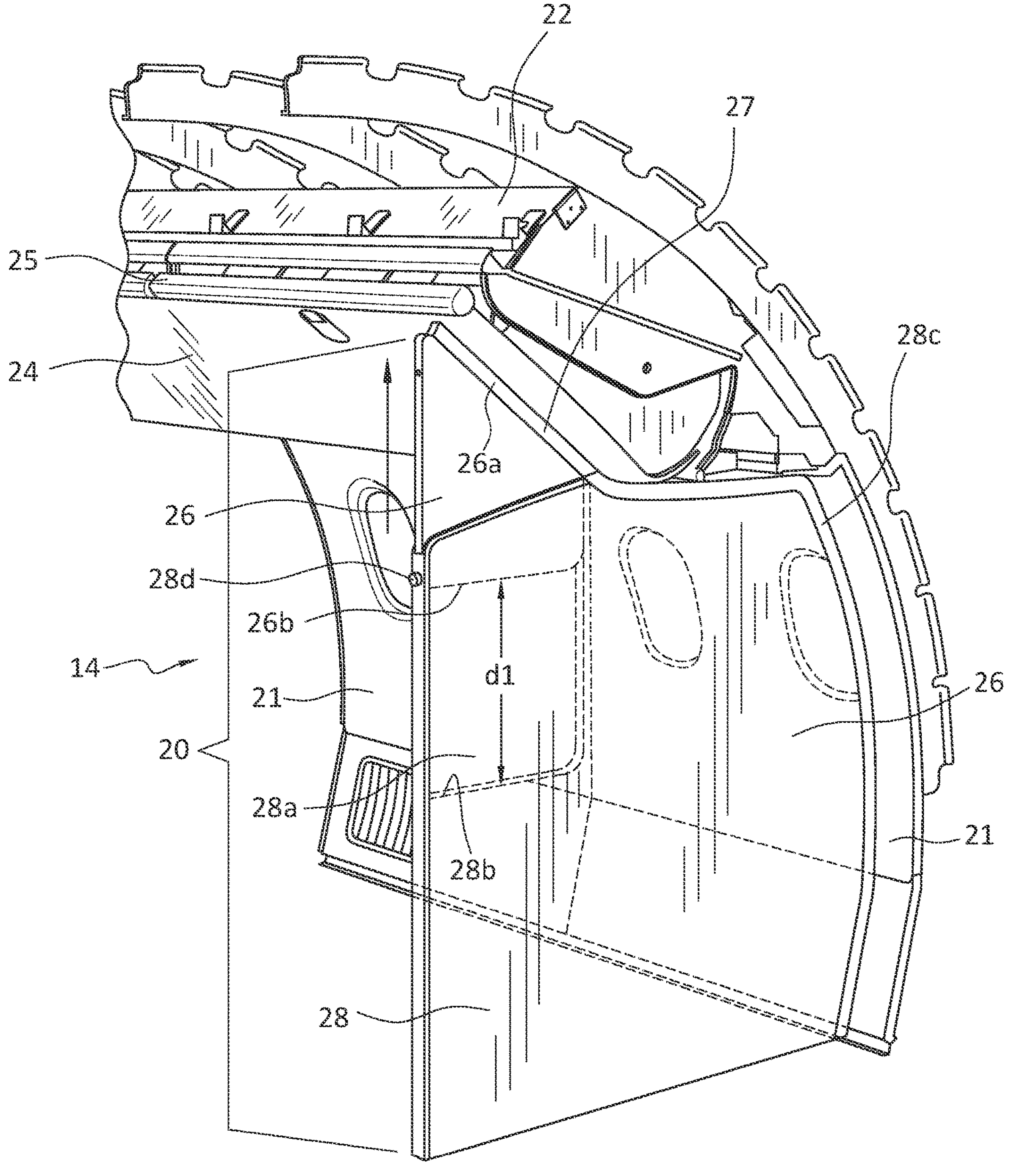
Figure 11:
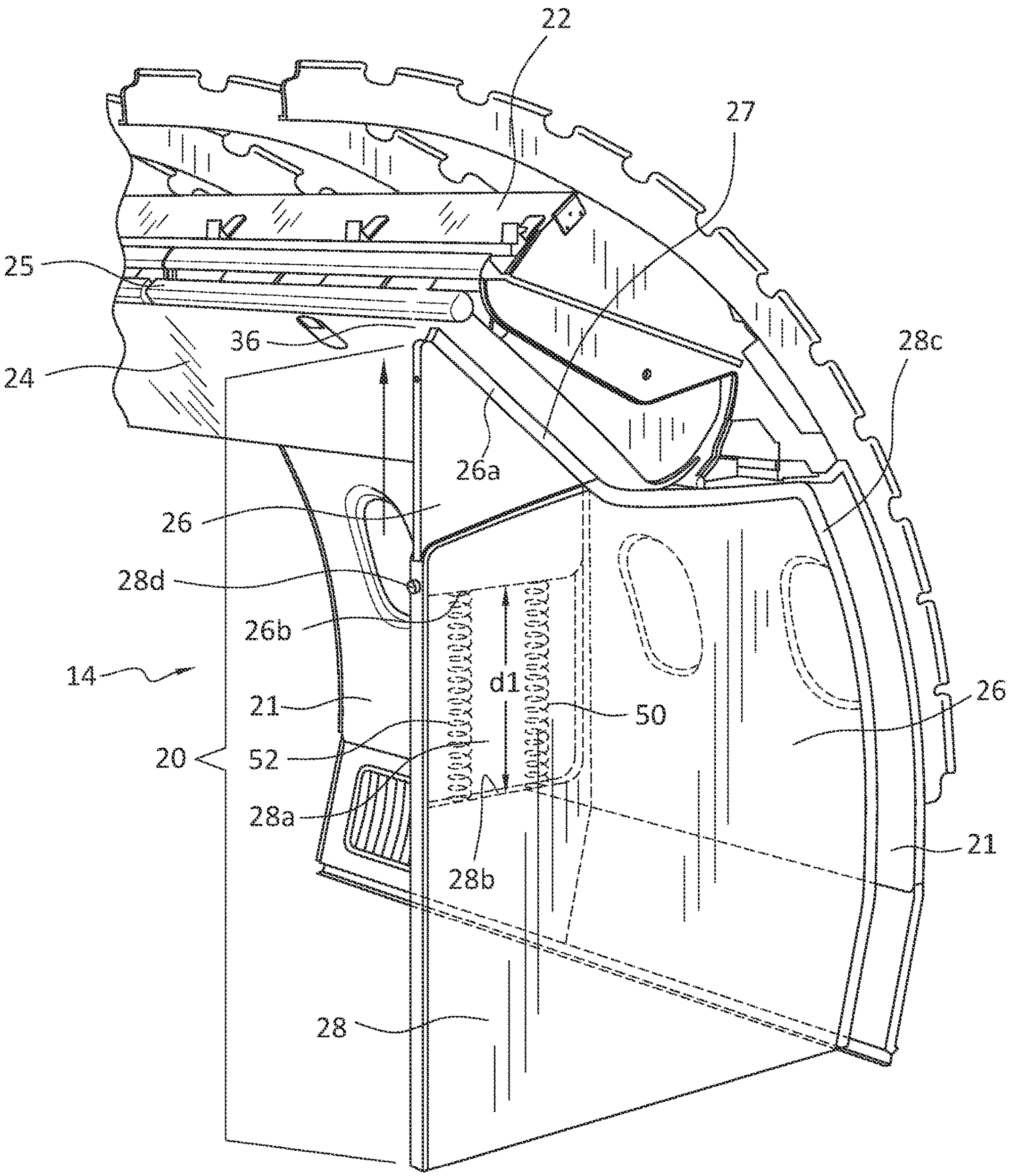
Figure 12:
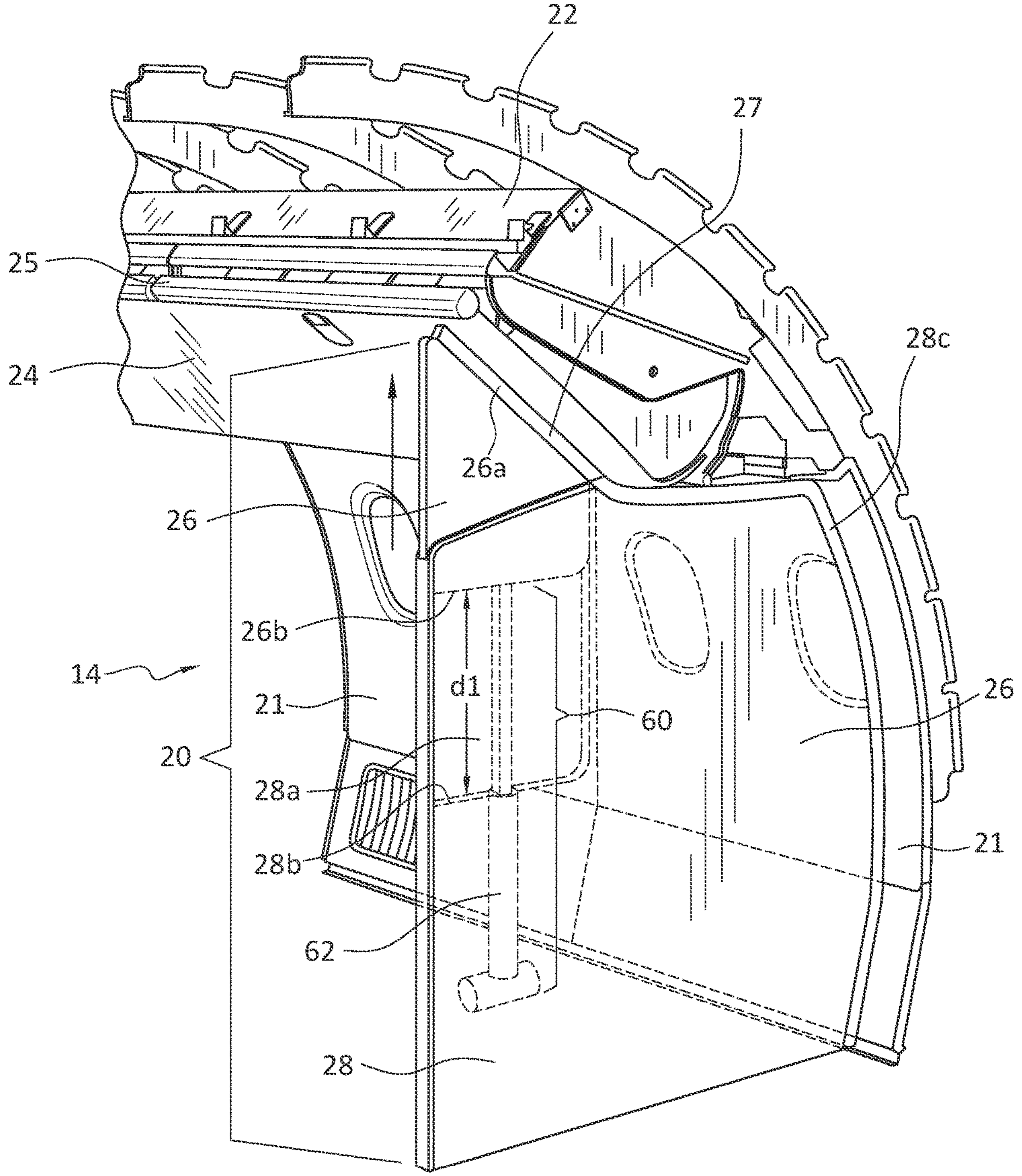
Figure 13:
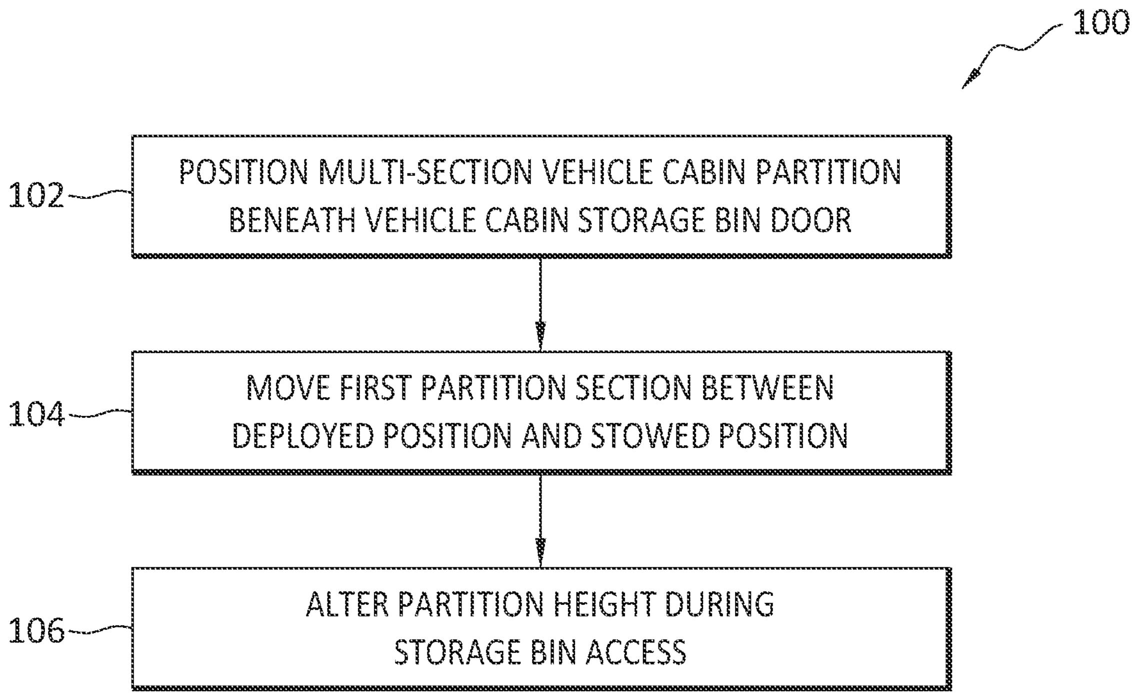
Figure 14:
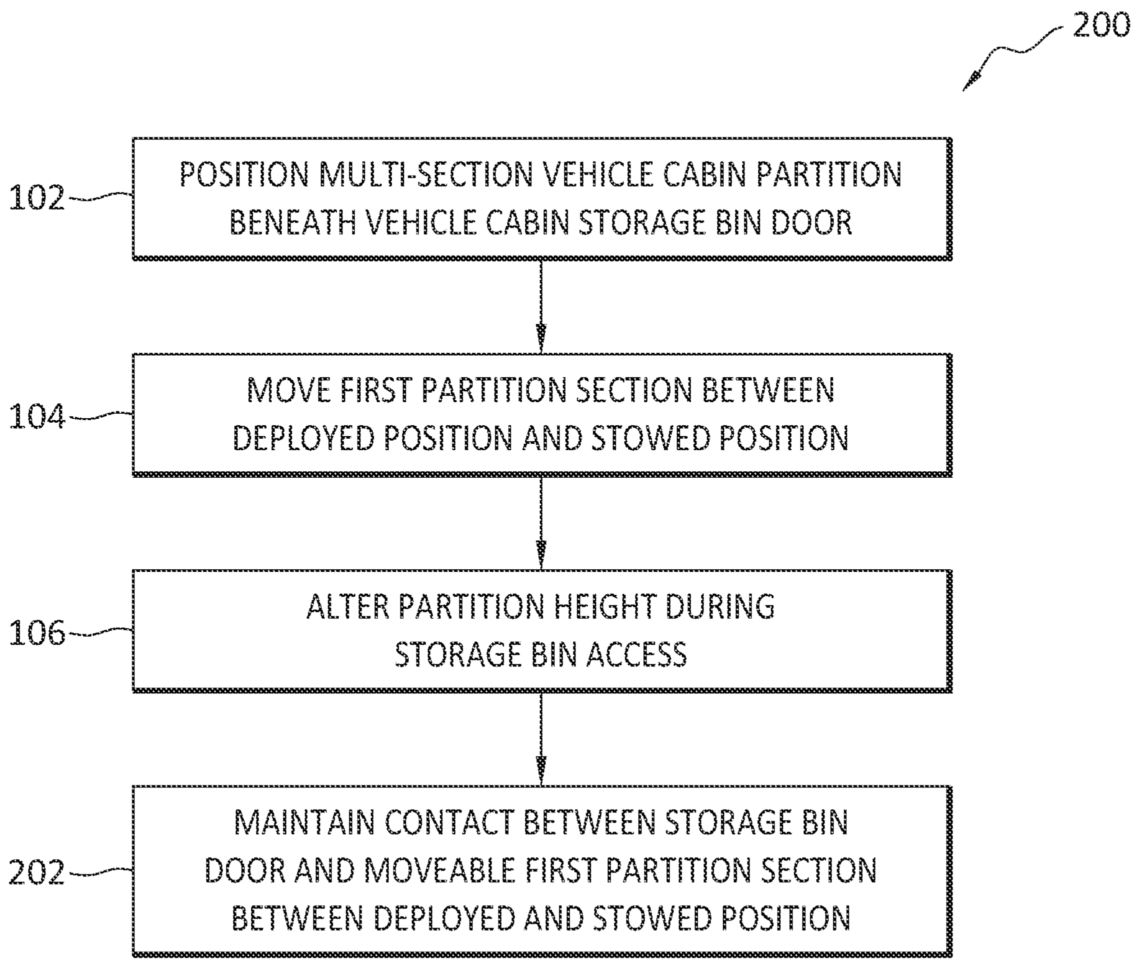
Figure 15:
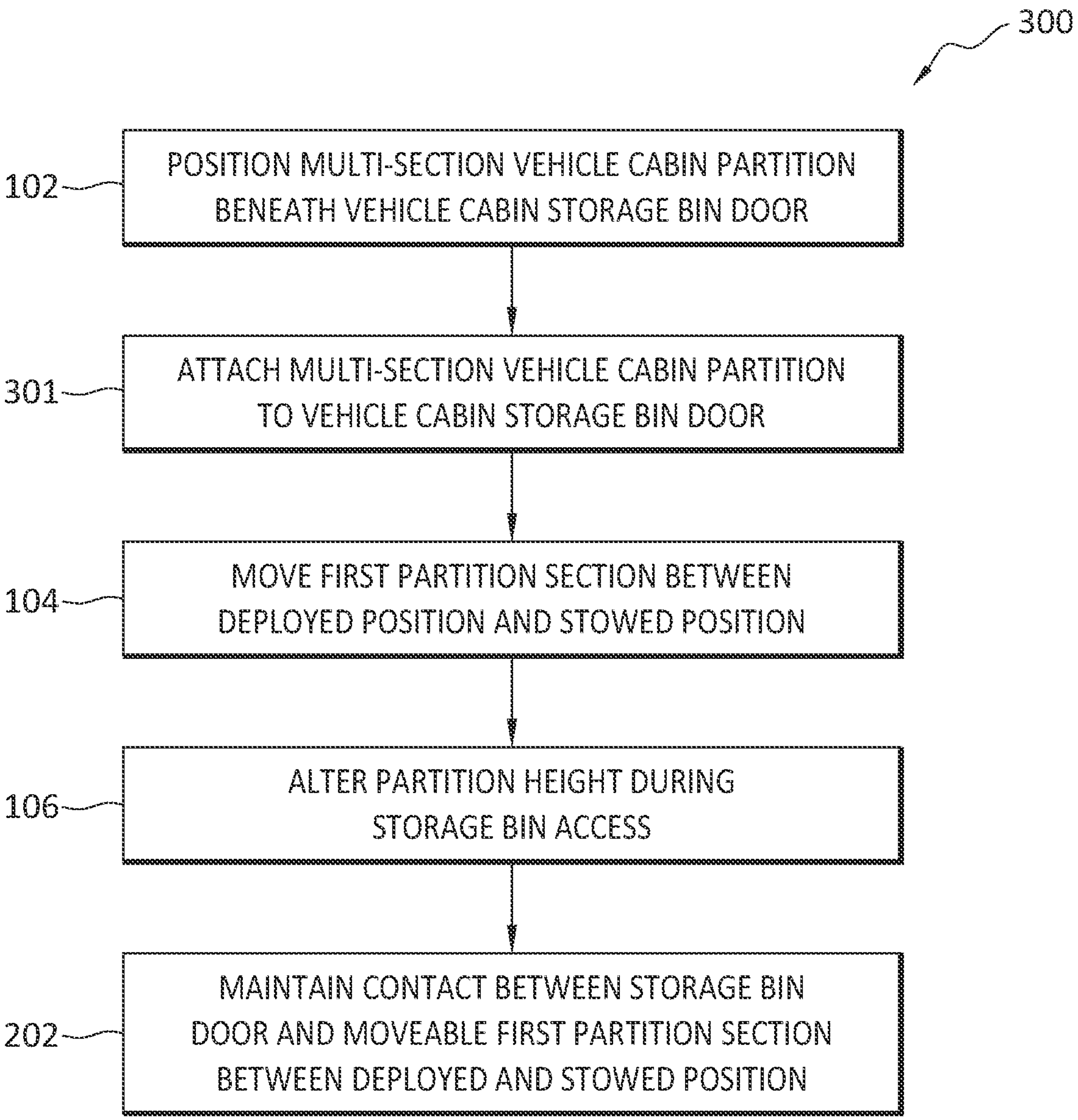
Figure 16:
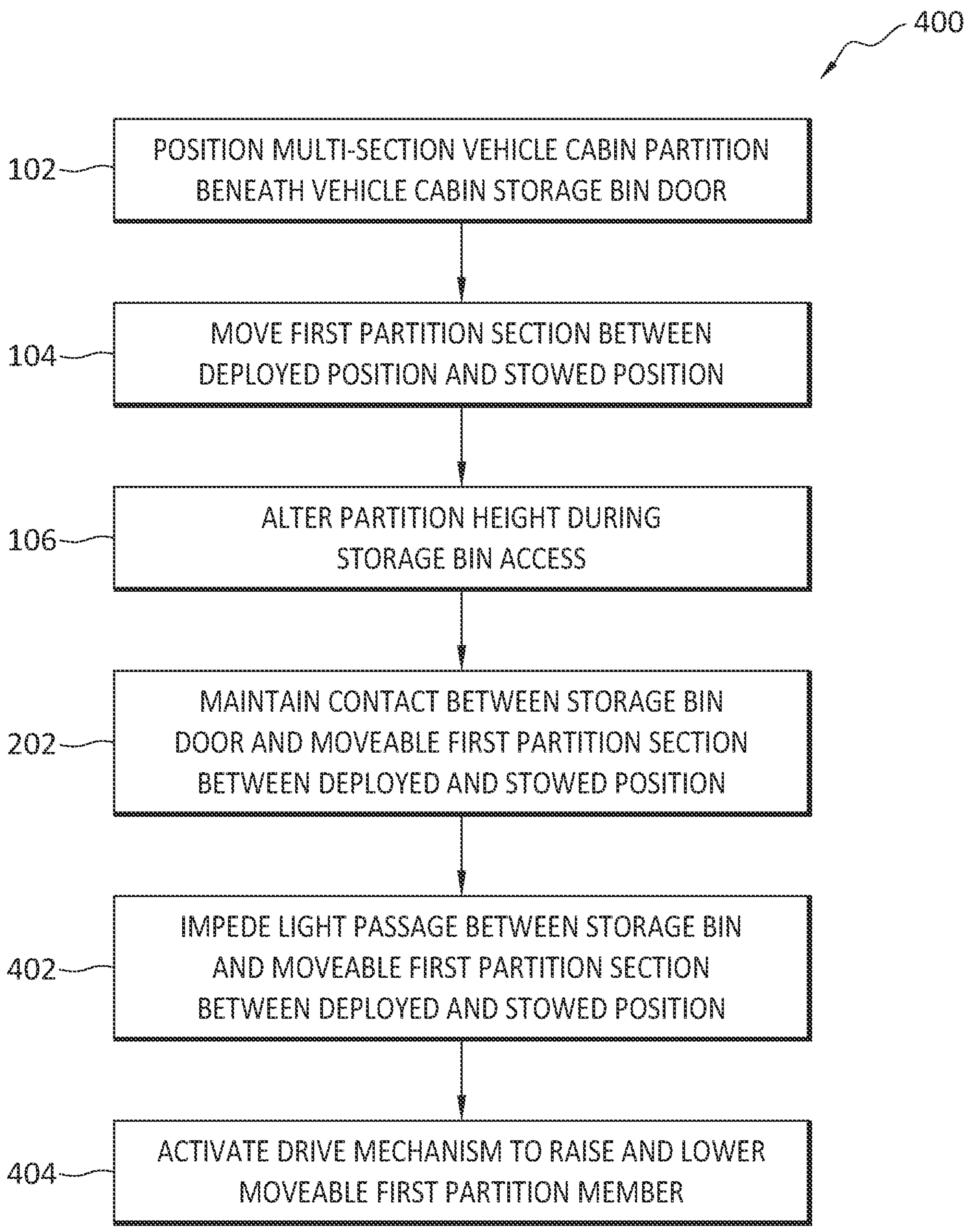

Having thus described variations of the disclosure in general terms, reference will now be made to the accompanying drawings, which are not necessarily drawn to scale, and wherein:

FIG. 1 is an illustration of a vehicle in the form of an aircraft, according to present aspects;

FIG. 2 is a cross-sectional view of a vehicle in the form of an aircraft that can be of the type shown in FIG. 1, and illustrating a vehicle cabin, according to present aspects;

FIG. 3 is a perspective view of a vehicle partition in a vehicle cabin, with the movable first partition section in the stowed configuration, according to present aspects;

FIG. 4 is an enlarged perspective view of a vehicle partition in a vehicle cabin of the type shown in FIG. 3, with the movable first partition section in the stowed configuration, according to present aspects;

FIG. 5 is a further enlarged perspective view of a vehicle partition in a vehicle cabin of the type shown in FIGS. 3 and 4, with the movable first partition section in the stowed configuration, according to present aspects;

FIG. 6 is an illustration of, for example, a forward view in an aircraft cabin toward a vehicle partition of the type shown in FIGS. 3, 4, and 5, with the movable first partition section in the stowed configuration, according to present aspects;

FIG. 7 is an illustration of a vehicle partition in a vehicle cabin with the movable first partition section in the deployed configuration, according to present aspects;

FIG. 8 is an enlarged perspective view of a vehicle partition in a vehicle cabin of the type shown in FIG. 7, with the movable first partition section in the deployed configuration, according to present aspects;

FIG. 9 is an illustration of a forward view toward a vehicle partition of the type shown in FIGS. 7 and 8, with the movable first partition section in the deployed configuration, according to present aspects;

FIG. 10 is an illustration of a perspective view of a vehicle partition with the movable first partition section manually-operated and in the deployed configuration, according to present aspects;

FIG. 11 is an illustration of a partially exposed view of a vehicle partition in a vehicle cabin with a spring-driven mechanism in the second partition section cavity, according to present aspects;

FIG. 12 is an illustration of a partially exposed view of a vehicle partition in a vehicle cabin including a drive mechanism that can be an electrically/driven and/or electrically motorized drive assembly and that can further be a pneumatic and/or hydraulic-driven mechanism at least partially positioned within the second partition section cavity, according to present aspects;

FIG. 13 is a flowchart outlining a method, according to present aspects;

FIG. 14 is a flowchart outlining a method, according to present aspects;

FIG. 15 is a flowchart outlining a method, according to present aspects; and FIG. 16 is a flowchart outlining a method, according to present aspects.

DETAILED DESCRIPTION

Present aspects are directed to a vehicle cabin partition assembly that allows unrestricted access to vehicle cabin storage bins that can be located above the vehicle cabin partition assembly. The ability to access storage bins and allow the storage bins located over a vehicle cabin partition allows the storage bins to be fully functioning (e.g., allows the bins to fully open and close in a completely unimpeded fashion according to their intended function, etc.), while maintaining a vehicle cabin partition that can fully function in terms of light-blocking and sight-blocking capability, as the upper edge of the vehicle cabin partition remains in intimate contact with the storage bin (equivalently referred to herein as "bin bucket") and remains a fully functioning partition even as the storage bin door is opened and closed, and the storage bin is accessed in unimpeded fashion by crew and/or passengers.

Even though the overall height of the partition changes when the storage bin is accessed and the storage bin door is opened and closed, the vehicle cabin partition that is a multi-section cabin partition (e.g., at least two associated sections with at least one vertically movable partition section that is movable and/or retractable with respect to at least one section that remains stationary and that is "pocketed" and internally dimensioned to receive and temporarily retain the at least one movable partition section) remains a "full height" and/or fully-functioning partition, and can be a fully light-blocking/light-sealing and fully sight blocking/sight-sealing partition that can, for example, at least partially separate cabin classes and/or cabin sections from one another.

The present vehicle cabin partition assemblies can be employed in vehicle cabins of vehicles, including, for example, terrestrial vehicles, marine vehicles, and aircraft that have storage bins in locations above a vehicle partition that is configured to contact a storage bin door of a storage bin.

FIG. 1 illustrates a vehicle in the form of an aircraft 10 comprising a fuselage 12, with the inner side of the fuselage 12, or structures attached to the inner side of the fuselage 12 (e.g., outboard cabin walls, ceilings, flooring, etc.), bounding an internally positioned aircraft cabin 14. FIG. 2 is a cross-sectional view into an aircraft cabin 14 of the type of aircraft 10 shown in FIG. 1, for example.

As shown in FIG. 2, aircraft 10 comprises a vehicle cabin in the form of an aircraft cabin 14 that is bounded by, at least, inner surfaces of fuselage 12, or components attached directly or indirectly to the inner surface of fuselage 12. Aircraft cabin 14 comprises aircraft cabin fixtures that can include cabin ceiling 23, vehicle cabin outboard wall 21 (having a surface exposed to and otherwise facing into aircraft cabin 14), storage bin assembly 22 (equivalently referred to herein as "bucket bin" and "vehicle cabin overhead storage bin") having storage bin door 24 (referred to equivalently as "vehicle cabin overhead storage bin door" and "bucket bin door"). FIG. 2 further shows vehicle cabin partition assembly 20 positioned in the vehicle cabin to separate vehicle cabin classes/sections/areas, with vehicle partition assembly 20 located beneath storage bin assembly 22, and in a position that, in the past, impeded the normal function of the storage bin door 24 to open downward from the storage bin assembly 22. According to present aspects, the function of the storage bin door to move from a closed position to an open position is facilitated, according to present aspects, while keeping or retaining the vehicle cabin partition in contact with the storage bin door and to maintain a "full-height" partition that is also sight-blocking and light-blocking through the action of opening and then re-closing the storage bin door.

FIG. 3 is an enlarged partial view from an aisle of the aircraft 10 facing vehicle cabin outboard wall of a vehicle cabin in the form of an aircraft cabin 14. As shown in FIG. 3, vehicle cabin partition assembly 20 is positioned in a substantially fixed location substantially perpendicular to vehicle cabin outboard wall 21 and is located beneath a section of vehicle cabin storage bin assembly 22. According to present aspects, vehicle cabin partition assembly 20 is a multi-section partition having a movable first partition section 26 that can retract or descend into second partition section 28 in the depicted "stowed" partition configuration that occurs when storage bin door 24 of storage bin assembly 22 is opened to, for example, gain access to the storage bin assembly 22. Storage bin door 24 of storage bin assembly 22 further comprises a storage bin door front panel 25 that can be a separate component or "panel" positioned along the length of the storage bin door 24. In another example, storage bin door front panel 25 can be an integral section of the storage bin door 24 of storage bin assembly 22.

As shown in FIG. 3 and as described herein, movable first partition section 26 would not be visible in the stowed partition configuration shown in FIG. 3, as movable first partition section 26 is "hidden" within, fully retracted into, and is otherwise completely received within second partition section cavity **28*a* located within second partition section 28. Second partition section cavity 28*a* is dimensioned to fully receive movable first partition section 26 into the second partition section cavity 28*a*. Stated another way, movable first partition section 26 is dimensioned to "fit" into and otherwise be fully received by (and retracted into and/or "within") second partition section cavity 28*a* of second partition section 28**.

FIG. 3 further shows a linkage assembly 30 that is further detailed in subsequently presented FIGs and further described here. As shown in FIG. 3 (and as better shown in at least FIG. 4), one end of linkage assembly 30 is attached (and can be removably attached, if desired) to storage bin door 24 at the storage bin door front panel 25 of storage bin assembly 22. Another end of linkage assembly 30 is attached to a location on movable first partition section 26 to facilitate the extraction (e.g., the "pulling out" or "raising") of the movable first partition section 26 from second partition section cavity **28*a* of second partition section 28 when the storage bin door 24 is closed, and the movable first partition section is "deployed" into a movable first partition section deployed configuration (not shown in FIG. 3**).

FIG. 4 is a further enlargement of the view shown in FIG. 3, with FIG. 4 showing the storage bin door 24 and storage bin door front panel 25 of storage bin assembly 22. Linkage assembly 30 is better visible in FIG. 4, with linkage assembly 30 comprising a linkage assembly first end 32 attached to storage bin assembly 22 at the storage bin door front panel 25 of storage bin door 24. In one example, as shown in FIGS. 3 and 4, linkage assembly first end 32 can engage storage bin door front panel 25 in a "wrapped" fashion as a "strap", for example. In other examples, the linkage assembly first end 32 can be otherwise attached to storage bin door front panel 25, or can be integral with storage bin front panel 25.

Linkage assembly second end 34 of linkage assembly 30 is attached to a location on movable first partition section 26 to facilitate the extraction (e.g., the "pulling out"" or "raising") of the movable of the movable first partition section 26 from second partition section cavity **28*a* of second partition section 28 when the storage bin door 24 is closed, and the movable first partition section is "deployed" into a movable first partition section deployed configuration (not shown in FIG. 3). In another example, linkage assembly second end can be integral with movable first partition section 26**.

FIG. 5 is a further enlargement, generally, of the views shown in FIGS. 3 and 4, with FIG. 5 further showing the storage bin door 24 and storage bin door front panel 25 of storage bin assembly 22. Linkage assembly 30 is perhaps better visible in FIG. 5, with linkage assembly 30 comprising a linkage assembly first end 32 attached to storage bin assembly 22 at the storage bin door front panel 25 of storage bin door 24. In one example, as shown in FIGS. 3 and 4, linkage assembly first end 32 can engage storage bin door front panel 25 in a "wrapped" fashion. In other examples, the linkage assembly first end can be otherwise attached to storage bin door front panel 25, or can be integral with storage bin front panel 25. Again, as shown in FIG. 5, linkage assembly second end 34 of linkage assembly 30 is attached to a location on movable first partition section 26 to facilitate the extraction (e.g., the "pulling out"" or "raising") of the movable of the movable first partition section 26 from second partition section cavity 28*a* of second partition section 28.

Linkage assembly arm 36 of linkage assembly 30 is shown in FIG. 5 as extending between and from linkage assembly first and second ends 32, 34, respectively. As shown in FIG. 5, linkage assembly arm 36 engages linkage assembly first end 32 at linkage assembly movable connection 36*a* that can be a pivoting engagement (e.g., a pivoting connection) such that linkage arm 36 can pivot within linkage assembly movable connection 36*a*. Linkage arm 36 further comprises or engages linkage assembly second end 34 at linkage assembly movable connection 36*b* that connects the linkage assembly second end 34 to movable first partition section 26 (e.g., shown in FIGS. 3, 4, 5 as a "corner" of the movable first partition section 26). Linkage arm 36 can be made from a suitable rigid, or semi-rigid material and dimensioned and constructed to withstand rated weight-lifting loads over a significant duration of repeated "pushing and pulling" cycles, and can be a metal, a plastic, a rubber-containing material, a composite material, and combinations thereof.

As shown in FIGS. 3, 4, 5, movable first partition section 26 is "hidden" from view; with movable first partition section 26 nested completely within second partition section 28 and located within second partition section cavity 28*a* of second partition section that is a "pocketed" partition section with cavity 28*a* dimensioned to receive movable first partition section in this movable first partition section "stowed" configuration that occurs when storage bin door 24 is opened (e.g., lowered) to also lower the movable first partition section into second partition section cavity 28*a*.

FIG. 6 is a view from within aircraft cabin 14 looking forward within aircraft cabin 14 of aircraft 10 of the type shown in FIGS. 1, 2, 3, 4, and 5. As shown in FIG. 6, vehicle cabin partition assembly 20 is again a multi-section partition assembly, with second partition section 28 shown as a pocketed second partition section and having second partition section cavity 28*a* dimensioned to receive, contain, "hide", store, etc., movable first partition section 26 within second partition section cavity 28*a* when the movable first partition section 26 of vehicle cabin (multi-section) partition assembly 20 is in the movable first partition section stowed configuration that coincides with the storage bin door 24 of storage bin assembly 22 moved into the open configuration to gain access to the storage bin.

Further aspects of the movable first partition section 26 housed and "hidden" within second partition section cavity 28*a* are shown in FIG. 6. In the movable first partition section stowed position, as shown in FIG. 6, the movable first partition section lower edge 26*b* can coincide with the bottom of second partition section cavity 28*a*. Alternatively, the second partition section cavity 28*a* can be dimensioned such that the movable first partition section lower edge 26*b* does not contact the cavity bottom 28*b* of the second partition section cavity 28*a*. FIG. 6 further shows the movable first partition section 26 comprising an upper edge contour seal 27. As will be shown in the FIGs. that illustrate the movable first partition section deployed position, the upper edge seal 27 of the movable first partition section will be brought into contact with the underside of the storage bin door 24 in such deployed position, and when the storage bin door is closed. FIG. 6 further shows second partition section seal 28*c* that forms a seal against the vehicle cabin outboard wall 21 and further forms a light-blocking seal against the storage bin assembly 22, and that further contacts the underside of storage bin door 24 only when the storage bin door is open. As will be shown in FIGS. 7, 8, 9, and 10, when the movable first partition section is deployed and visible and the storage bin door is closed, it is the upper edge seal 27 of the of the movable first partition section that will contact the underside of the closed storage bin door.

FIGS. 7, 8, 9, 10 illustrate the present vehicle cabin multi-section partition assembly of the type shown in FIGS. 2, 3, 4, 5, and 6; however, in FIGS. 7-10, the vehicle cabin partition assembly shows the movable first partition section now in the deployed configuration that coincides with the storage bin door (to which the movable first partition section is attached) being moved from an open storage bin door position to a position where the storage bin door has been closed. According to present aspects, as the storage bin door is closed by crew or a passenger, the force required to close the storage bin door will be adequate to coincidentally and concurrently "raise" the movable first partition section from the nested position within the second partition section cavity 28*a* of the second partition section 28 to a movable first partition section deployed position, that "exposes" the movable first partition section.

As shown in FIG. 7, the storage bin assembly and the storage bin door 24 are now in a closed configuration with the storage bin door having been lifted upward by crew or passenger and latched or locked closed. As the storage bin door is moved upward, the linkage assembly 30 that connects the storage bin door 24 at the storage bin door panel 25 to the movable first partition section 26 translates or otherwise transfers a portion of the upward force (supplied by crew or passenger to the storage bin door 24) to also direct the movable first partition section 26 in an upward direction, with the movable first partition section 26 raised upward from out of the second partition section cavity 28*a* into the movable first partition section deployed position that coincides in time with the storage bin door closed position.

As the movable first partition section 26 emerges from the second partition section cavity 28*a* and proceeds toward the movable first partition section fully deployed position, the upper edge contour seal 27 of the movable first partition section 26 (that can further form a movable first partition section upper edge contour 26*a*) will intimately contact the contour of the underside of the storage bin door 24 (that can be configured to substantially reciprocate with and/or "match" the movable first partition section upper edge contour 26*a*), with the upper edge seal 27 contacting the storage bin door 24 throughout the operation of the closing of the storage bin door and through the upward movement (e.g., the "raising") of the movable first partition section 26 as it emerges from the second partition section cavity 28*a*. In other words, when the storage bin door is open, the storage bin door will rest against a second partition section seal 28*c* located along the top of the second partition section, and shown in FIG. 7 as the second partition section seal 28*c*.

In operation, according to one example, as the storage bin door 24 is lifted toward a closed position, and as the storage bin door 24 leaves the surface of the second partition section 28, the upper edge contour seal 27 of the movable first partition section 26 will substantially immediately contact the contour of the underside of the storage bin door 24 to maintain contact between the partition assembly 20 and the storage bin assembly 22 (at the storage bin door 24). By maintaining this contact between the elements of the partition assembly 20 and the storage bin assembly 22, the partition assembly 20 maintains continuous and continual sight-sealing privacy and light-sealing privacy at the partition assembly/storage bin assembly interface during opening and closing of the storage bin door 24, and otherwise provides the substantially uninterrupted complete partitioning between aircraft cabin areas, aircraft cabin regions, and/or aircraft cabin "classes".

FIG. 8 is an enlarged view of a portion of the view shown in FIG. 7, with the storage bin door 24 closed and fully engaged with the storage bin assembly 22; and with the movable first partition section 26 in the fully deployed configuration (as shown in FIG. 7), and explained herein. FIG. 8 shows the storage bin door 24 and storage bin door front panel 25 of storage bin assembly 22. Linkage assembly 30 is shown having a linkage assembly first end 32 attached to storage bin assembly 22 at the storage bin door front panel 25 of storage bin door 24. In one example, linkage assembly first end 32 can engage storage bin door front panel 25 in a "wrapped" fashion via, for example, a strap. In other examples, the linkage assembly first end can be otherwise attached to storage bin door front panel 25, or can be integral with storage bin front panel 25. As shown in FIG. 8, linkage assembly second end 34 of linkage assembly 30 is attached to a location on movable first partition section 26 to facilitate: 1) the extraction (e.g., the "pulling out"" or "raising") of first partition section 26 from second partition section cavity 28*a* of second partition section 28; and 2) the retaining in position against the storage bin door 24 of the movable first partition section 26.

In another aspect, as shown in FIG. 8, the movable first partition section 26 includes a movable first partition section including a movable first partition section upper edge contour 26*a* dimensioned to substantially match the overhead storage bin door surface contour 24*a* of the storage bin door 24. In a further aspect, the upper edge contour 26*a* of the movable first partition section 26 includes an upper edge contour seal 27 disposed along a length of the upper edge contour 26*a*, with the upper edge contour seal 27 configured to substantially completely contact the vehicle cabin overhead storage bin door contour 24*a* when the movable first partition section is in the movable first partition section deployed configuration.

Linkage assembly arm 36 of linkage assembly 30 is shown in FIG. 8 as extending between and from linkage assembly first and second ends 32, 34, respectively. As shown in FIG. 8, linkage assembly arm 36 engages linkage assembly first end 32 at linkage assembly movable connection 36*a* that can be a pivoting engagement (e.g., a pivoting connection) such that linkage arm 36 can pivot within linkage assembly movable connection 36*a*. Linkage arm 36 further comprises or engages linkage assembly second end 34 at linkage assembly movable connection 36*b* that connects the linkage assembly second end 34 to movable first partition section 26.

FIG. 9 is a view from within aircraft cabin 14 looking forward within aircraft cabin 14 of aircraft 10 of the type shown at least in FIGS. 7 and 8 where the partition assembly 20 comprises the movable first partition section is positioned in the movable first partition section deployed position. As shown in FIG. 9, vehicle cabin partition assembly 20 is again a multi-section partition assembly, FIG. 9 shows the multi-section vehicle cabin partition assembly 20 in the movable first partition section 26 in the deployed configuration, and with the storage bin door 24 in the closed position. FIG. 9 differs from FIG. 6 in that FIG. 6 shows the vehicle cabin assembly 20 in the movable first partition section stowed configuration that coincides with the storage bin door 24 of storage bin assembly 22 moved into the open configuration to gain access to the storage bin.

As shown in FIG. 9, the second partition section cavity 28*a* is perhaps more clearly shown, as a distance, "d1" now exists between the second partition section cavity "bottom" 28*b* and the movable first partition section bottom edge 26*b*, indicating that the movable first partition section in the deployed configuration has emerged from the cavity 28*a*, and that a portion of the second partition section cavity (that housed the movable first partition section in the stowed configuration) is now unoccupied.

FIG. 9 further shows the movable first partition section 26 comprising an upper edge contour seal 27. As shown in FIG. 9, in the movable first partition section deployed configuration of the partition assembly 20, the upper edge seal 27 of the movable first partition section is in contact with the underside of the storage bin door 24, and with the storage bin door 24 in the closed configuration. FIG. 9 further illustrates a plurality of fasteners 29 (that can be, for example, curtain snaps, etc.) located along second partition section edge 29*a* than can be substantially equivalently spaced, and that can serve as attachment points for further cabin barriers (e.g., barrier curtains, panels, etc.) that can be used to extend, for example, across a cabin aisle to further denote or contribute to sight-sealing/light-sealing between vehicle cabin sections, or "classes". The fasteners can comprise mating features selected to "mate" with complementary fastener sections present on such further cabin barriers, and can include, for example, snap-type fasteners, twist-lock fasteners, etc.

FIGS. 10, 11, and 12 are views of the present multi-section vehicle cabin partition assembly in position in a vehicle cabin of a vehicle that is in the form of an aircraft cabin 14 of an aircraft 10. In each of FIGS. 10, 11, and 12, the multi-section vehicle cabin partition assembly 20 comprises a movable first partition section extending from the second partition section in the deployed position (referred to equivalently herein as "deployed configuration" and "deployed state"), and with the storage bin door 24 of the storage bin assembly 22 in the closed position. In each of FIGS. 10, 11, and 12, an arrow indicates the direction that the movable first partition section moves as it emerges from the "pocket" or cavity within the second partition section (an "upward" direction).

According to present aspects, the movable first partition section of the multi-section vehicle cabin partition assembly can be "moved" (e.g. raised out of and lowered into the second partition cavity, or "pocket") relative to the stationary second partition at least indirectly by applying a manual force to the storage bin door that is attached via the linkage assembly to the movable first partition section of the partition assembly.

That is, as described herein, when a linkage assembly joins or is otherwise in communication with the movable first partition section and the storage bin door, the movement and force (supplied, for example, as manual force by crew or a passenger) required to move the storage bin door upward and downward will coincidently move the movable first partition section upward and downward with respect to the second partition section that can remain in a stationary position.

In another example, according to present aspects, the movable first partition section is not engaged via any linkage to the storage bin door. According to this example, the movable first partition section is dimensioned to nest within the second partition section cavity (that is dimensioned to receive substantially completely the movable first partition section) in the movable first partition section stowed position. In this stowed position, the storage bin can be opened and closed in unimpeded fashion. In this example, with no linkage assembly in place, once a storage bin is closed, a crew member can manually extract the movable first partition section from the stowed position within the second partition section cavity. The crew member can raise the movable first partition section to a deployed position such that the movable first partition section rests adjacent to and otherwise contacts the underside of the storage bin door, with the movable first partition section, for example, engaging a locking mechanism housed within the at least one of the movable first partition section and the second partition section second, with evidence of a proper deployed position occurring by, for example, the movable first partition section "clicking" into the deployed and now locked position. When access to the storage bin is required, the locking mechanism can be disengaged by a crew member to release the locked movable first partition section from the locked position. This "manual" operation of the present partition assembly is illustrated in FIG. 10.

In other examples, according to present aspects, a force can be applied to the movable first partition section manually, and/or through the use of drive mechanisms of drive assemblies (that can be incorporated into, or that can be otherwise in communication with the partition assembly) that can be automated and that can be powered by electrical, pneumatic, hydraulic drives, etc., and that may be a combination of electro-mechanical dive mechanisms and drive assemblies (equivalently referred to herein as "drives"). At least a portion of the drive assemblies can be located within the second partition section and extend through the second partition section and into the second partition section cavity and contact, for example, the lower edge or region of the movable first partition section. When activated and otherwise engaged automatically, or by an operator, the drive assemblies can deliver a force to the movable first partition section to direct the movable first partition section in an "upward" direction to a deployed state (and extending upwardly out from the second partition section cavity), and "downward" to a stowed state/position/configuration (moving downward to nest within the pocket in the second partition section established by the second partition section cavity). Present aspects incorporating a "drive" are shown in FIGS. 11 and 12.

According to additional present aspects, the drive assemblies and mechanisms can produce a "drive-assisted" opening and closing of the storage bin door connected to the present multi-section vehicle cabin partition assembly. In another example, a combination of manual force and drive-assisted action can deploy and stow both the movable first partition section and the storage bin assembly door. In a further example, drive assemblies can be activated by incorporating sensors, controllers, processors, and associated hardware, software, and power supplies, with sensors configured to "sense" the application of a manual force on the storage bin door, and triggers operation of the drive mechanisms to "assist" or complete the opening and closing of the storage bin door.

FIG. 10 illustrates the application of force manually to deploy the movable first partition section. FIGS. 11 and 12 illustrate the incorporation of a spring-loaded mechanism (FIG. 11) or electrically-; pneumatically-; hydraulically-driven (or a combination thereof) drive mechanisms associated with the vehicle cabin partition assembly that can have the resulting effect of moving both the storage bin door and the movable first partition section between stowed and deployed positions. Again, FIGS. 10, 11, and 12 illustrate the present vehicle cabin multi-section partition assembly similar to the type shown in FIGS. 7, 8, 9, but lacking the linkage assembly 30 that is shown and present in FIGS. 3-9. FIGS. 10, 11, and 12 (with similarly numbered features throughout) show the multi-section vehicle cabin partition assembly with the movable first partition section now in the movable first partition section deployed configuration, and where the storage bin door is now closed.

According to one example, to achieve the deployed position of the movable first partition section, as shown in FIG. 10, the storage bin door has been closed by, for example, a crew member, and the movable first partition section 26 has been manually and separately raised and/or extracted from a stowed position (nested within the second partition section cavity 28*a* or second partition section 28) in the direction of the "arrow" to a movable first partition section deployed position, that "exposes" the movable first partition section. Successful "locking" of the movable first partition section into a "locked" position can be evidenced by locking mechanism 28*d* engaging and retaining the movable first partition section into position in a locked position. As shown in FIG. 10, a locking mechanism can be depressed to mechanically or electro-mechanically release the locking mechanism, allowing the movable first partition section to return to stowed position from the locked deployed position, for example.

FIG. 11 illustrates a view that is the same as FIG. 10 (with similarly numbered features present throughout), with the addition of a drive assembly in the form of a spring assembly 50 that includes a spring-loading mechanism 52 shown at least partially residing within second partition section cavity 28*a* of second partition section 28. According to present aspects, the presence of a spring-loading mechanism can obviate the need for a locking mechanism, although a locking mechanism can be incorporated into this configuration with the spring-loading mechanism, as an added safety feature to insure that the movable first partition section remains securely in the deployed position, and adjacent to and in contact with the underside of the storage bin door 24.

FIG. 12 illustrates a view, of another example, and present aspect (with similarly numbered features present throughout as those presented in FIG. 11), with the presence of a drive assembly 60 that includes a representative electric motorized and/or pneumatic/hydraulic-drive mechanism 62 shown residing substantially entirely within second partition section cavity 28*a* of second partition section 28. In another example, if at least a portion of the second partition section is extended though the "height" of the second partition section, some features of the drive assembly and mechanism selected could reside below the aircraft flooring, for example.

According to present aspects, as shown in FIGS. 11 and 12, the storage bin door is closed by crew or a passenger, with the force required to close the storage bin door supplied in whole or in part by the drive mechanism/drive assembly that can be an automated function that is activated by, for example, a crew member. In this example, the automated force provided by the drive assembly or spring assembly will be adequate to coincidentally (and concurrently, and in real time) close the storage bin door and "raise" the movable first partition section in the direction of the "arrow" (from the nested/stowed position within the second partition section cavity 28*a* of the second partition section 28) to a movable first partition section deployed position (and that "exposes" the movable first partition section).

As described herein, the drive mechanism/and drive assembly selected and shown in FIGS. 11 and 12 can also further comprise or be in communication sensors, controllers, processors, and associated hardware, software, and power supplies, with sensors configured to "sense" the application of a manual force on the storage bin door, and trigger operation of the drive mechanisms to "assist" or complete the opening and closing of the storage bin door.

While the FIGs. illustrate the present multi-section vehicle cabin partition assemblies positioned at, and useful with, facilitating access to storage bin assemblies that were previously blocked by outboard-located partitions and in communication with (and positioned and located substantially perpendicular to) vehicle cabin outboard cabin walls, present aspects further contemplate the use of the present multi-section partition assembly to facilitate access and to be used in conjunction with storage bin assemblies at inboard and/or center-aisle locations in an vehicle cabin, including aircraft cabins of aircraft.

The multi-section partition assembly can comprise vehicle cabin panels including aircraft cabin partition panels that have been certified for use and that meet fire-rating standards and regulations. Such vehicle cabin panels can include sandwich panel constructions that can further, for example, include honeycomb sandwich panel structures that have been approved for aircraft passenger cabin use.

FIGS. 13, 14, 15, and 16 are flowcharts outlining methods according to present aspects. FIG. 13 outlines a present method 100 for altering a vehicle cabin partition height during vehicle cabin storage bin access, with the method including positioning 102 a multi-section vehicle cabin partition assembly beneath a vehicle cabin overhead storage bin door of a vehicle cabin overhead storage bin, with the vehicle cabin overhead storage bin including a vehicle cabin overhead storage bin door contour.

The multi-section vehicle cabin partition includes a movable first partition section, with the movable first partition section including a movable first partition dimension, and with the movable first partition section configured to move between a movable first partition section deployed position and a movable first partition section stowed position. The multi-section vehicle cabin partition further includes a second partition section, with the second partition section including a second partition section cavity, with the second partition section cavity including a second partition section cavity dimension (e.g., length, width, height), and with the second partition section cavity dimension at least partially bounded by a second partition section cavity wall. The movable first partition section dimension is configured to be received substantially completely into the second partition section cavity in the movable first partition section stowed position.

The method 100 further includes moving 104 the movable first partition section between a movable first partition section deployed position and a movable first partition section stowed position, and altering 106 the vehicle cabin partition height during vehicle cabin storage bin access.

FIG. 14 outlines a method 200 that includes the aspects of method 100 shown in FIG. 13, and further includes maintaining 202 contact between the vehicle cabin overhead storage bin door contour and the movable first partition section upper edge contour both in the movable first partition section deployed position and in the movable first partition section stowed position.

In another aspect, FIG. 15 outlines a method 300 that includes the aspects of methods 100 and 200 and further includes attaching 302 the multi-section vehicle cabin partition to the vehicle cabin storage bin door. The multi-section vehicle cabin partition assembly can further include a linkage assembly comprising a linkage assembly first end in communication with a movable overhead storage bin door of an overhead storage bin assembly, with the overhead storage bin assembly including an overhead storage bin door having, an overhead storage bin door surface contour, and with the linkage assembly further includes a linkage assembly second end in communication with the movable first partition section, The linkage assembly further includes a linkage assembly arm. The linkage assembly arm extends from and is in communication with the linkage assembly first end 32, with the linkage assembly arm further extending to and in communication with the linkage assembly second end 34*a*.

FIG. 16 outlines a method 400, according to present aspects, with method 400 including the aspects of methods 100, 200, with method 400 further including impeding 402 the passage of light between the vehicle cabin overhead storage bin door surface contour and the first partition section upper edge contour both in the movable first partition section deployed position and in the movable first partition section stowed position, and activating 404 a drive mechanism positioned within the second partition section cavity, with the drive assembly configured to raise and lower the movable first partition section relative to the second partition section.

The methods outlined in FIGS. 13, 14, 15, and 16 can employ the systems and apparatuses presented in one or more of FIGS. 1, 2, 3, 4, 5, 6, 7, 8, 9, 10, 11 and 12

The term "substantially" as used herein means that a particular characteristic, parameter, or value does not need to be exactly achieved. Rather, deviations or variations, including, for example, tolerances, measurement error, measurement accuracy limitations, and other factors known to those skilled in the field, may occur in amounts that do not preclude the effect that the characteristic was intended to provide.

The present aspects may, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. A vehicle cabin partition assembly located beneath a section of vehicle cabin storage bin assembly comprising:

a movable first partition section;

a second partition section, said second partition section comprising a second partition section cavity, said second partition section cavity comprising a second partition section cavity dimension, said second partition section cavity dimension at least partially bounded by a second partition section cavity wall, said second partition section further comprising:

a drive assembly, said drive assembly in communication with the movable first partition section, said drive assembly configured to move the movable first partition section between a movable first partition section deployed position and a movable first partition section stowed position, said drive assembly housed within the second partition section cavity, said drive assembly comprising a drive mechanism, said drive mechanism comprising at least one of a screw-driven mechanism, an electrical-drive mechanism, a pneumatic-drive mechanism, and a hydraulic-drive mechanism;

wherein the movable first partition section comprises a movable first partition dimension, said movable first partition section dimension configured to be received substantially completely into and nested within the second partition section cavity in a movable first partition section stowed position within the second partition section cavity;

wherein the movable first partition section is configured to move vertically within the second partition cavity, said movable first partition section further configured to move within the second partition cavity between a movable first partition section deployed position and the movable first partition section stowed position;

wherein said movable first partition section is exposed in a movable first partition section deployed position; and wherein said vehicle cabin partition assembly is located beneath and in communication with the section of vehicle cabin storage bin assembly, said section of vehicle cabin storage bin assembly comprising an overhead storage bin assembly, said overhead storage bin assembly comprising a movable overhead storage bin door, said movable overhead storage bin door comprising an overhead storage bin door surface contour, said vehicle cabin partition assembly further positioned in a substantially fixed location substantially perpendicular to and in communication with a vehicle cabin outboard wall.

2. The vehicle cabin partition assembly of claim 1, further comprising a linkage assembly comprising a linkage assembly first end in communication with the movable overhead storage bin door of the overhead storage bin assembly, said overhead storage bin assembly comprising an overhead storage bin door, said overhead storage bin door comprising an overhead storage bin door surface contour, said linkage assembly further comprising a linkage assembly second end in communication with the movable first partition section.

3. The vehicle cabin partition assembly of claim 2, said linkage assembly further comprising:

a linkage assembly arm, said linkage assembly arm extending from and in communication with the linkage assembly first end, said linkage assembly arm further extending to and in communication with the linkage assembly second end.

4. The vehicle cabin partition assembly of claim 1, further comprising a locking mechanism, said locking mechanism configured to lock into place the movable first partition section in the movable first partition section deployed position, said locking mechanism further configured to release said movable first partition section from the movable first partition section deployed position to the movable first partition section stowed position.

5. The vehicle cabin partition assembly of claim 1, wherein the movable first partition section comprises a movable first partition section upper edge contour dimensioned to substantially match the overhead storage bin door surface contour.

6. The vehicle cabin partition assembly of claim 5, wherein the movable first partition section upper edge contour comprises an upper edge contour seal disposed along a length of the movable first partition section upper edge contour, said upper edge contour seal configured to substantially completely contact the vehicle cabin overhead storage bin door surface contour when the movable first partition section is in the movable first partition section deployed configuration, said upper edge contour seal further configured to substantially completely contact the vehicle cabin overhead storage bin door surface contour when the movable first partition section is in the movable first partition section stowed configuration.

7. A vehicle cabin comprising the vehicle cabin partition assembly of claim 1.

8. An aircraft cabin comprising the vehicle cabin partition assembly of claim 1.

9. An aircraft comprising the vehicle cabin partition assembly of claim 1.

10. The vehicle cabin partition assembly of claim 1, wherein said drive mechanism incorporates a sensor, said sensor configured to sense application of a manual force on the storage bin door, said application of a manual force on the storage bin door configured to trigger operation of the drive mechanism to assist opening and closing of the storage bin door.

11. A light-blocking and sight-blocking partition for separating vehicle cabin sections, the light-blocking and sight-blocking partition comprising:

a movable first partition section comprising a movable first partition section upper edge contour;

a pocketed second partition section, said pocketed second partition section comprising a pocketed second partition section cavity dimensioned to substantially completely receive the movable first partition section into the pocketed second partition section cavity;

a vehicle cabin overhead storage bin assembly comprising a vehicle cabin overhead storage bin door comprising a vehicle cabin overhead storage bin door surface contour;

a drive assembly housed within the pocketed second partition section, said drive assembly in communication with the movable first partition section, said drive assembly configured to move the movable first partition section between a movable first partition section deployed position and a movable first partition section stowed position, said drive assembly at least partially housed within a second partition section cavity, said drive assembly comprising at least one of a screw-drive mechanism, an electrical-drive mechanism, a pneumatic-drive mechanism, and a hydraulic-drive mechanism;

wherein the movable first partition section is configured to move between a movable first partition section deployed position and a movable first partition section stowed position;

wherein the movable first partition section upper edge contour is configured to contact the vehicle cabin overhead storage bin door surface contour in the movable first partition section deployed position;

wherein said movable first partition section is configured to maintain partition sight-blocking and partition light-blocking capabilities throughout movement of the movable first partition section between the movable first partition section deployed position and the movable first partition section stowed position; and wherein said vehicle cabin partition assembly is located beneath, is perpendicular to, and is in communication with a section of vehicle cabin storage bin assembly, said vehicle cabin partition assembly further positioned in a substantially fixed location substantially perpendicular to and in communication with a vehicle cabin outboard wall.

12. The light-blocking and sight-blocking partition of claim 11, further comprising:

a linkage assembly comprising a linkage assembly first end in communication with the storage bin door of a vehicle overhead storage bin assembly, said linkage assembly further comprising a linkage assembly second end in communication with the movable first partition section, said linkage assembly further comprising a linkage assembly arm, said linkage assembly arm extending from and in communication with the linkage assembly first end, said linkage assembly arm further extending to and in communication with the linkage assembly second end.

13. The light-blocking and sight-blocking partition of claim 11, said movable first partition section upper edge contour further comprising an upper edge contour seal configured to cover the movable first partition section upper edge contour.

14. An aircraft comprising the light-blocking and sight-blocking partition of claim 11.

15. The light-blocking and sight-blocking partition of claim 11, wherein said drive mechanism incorporates a sensor, said sensor configured to sense application of a manual force on the storage bin door, said application of a manual force on the storage bin door configured to trigger operation of the drive mechanism to assist opening and closing of the storage bin door.

16. A method for altering vehicle cabin partition height during vehicle cabin storage bin access, the method comprising:

positioning a multi-section vehicle cabin partition assembly beneath a vehicle cabin overhead storage bin door of a vehicle cabin overhead storage bin, said vehicle cabin overhead storage bin comprising a vehicle cabin overhead storage bin door contour, said multi-section cabin partition comprising:

a movable first partition section, said movable first partition section comprising a movable first partition dimension, said movable first partition section configured to move between a movable first partition section deployed position and a movable first partition section stowed position;

a second partition section, said second partition section comprising a second partition section cavity, said second partition section cavity comprising a second partition section cavity dimension, said second partition section cavity dimension at least partially bounded by a second partition section cavity wall, said movable first partition section dimension configured to be received substantially completely into and nested within the second partition section cavity in a movable first partition section stowed position within the second partition section cavity, said second partition section cavity configured to house a drive assembly, said drive assembly in communication with the movable first partition section, said drive assembly configured to move the movable first partition section between a movable first partition section deployed position and a movable first partition section stowed position, said drive assembly at least partially housed within the second partition section cavity, said drive assembly comprising at least one of a screw-drive mechanism, an electrical-drive mechanism, a pneumatic-drive mechanism, and a hydraulic-drive mechanism;

moving the movable first partition section between a movable first partition section deployed position and a movable first partition section stowed position;

altering the vehicle cabin partition height during vehicle cabin storage bin access in response to movement of the storage bin door;

maintaining contact between the vehicle cabin overhead storage bin door contour and the movable first partition section upper edge contour in the movable first partition section deployed position and in the movable first partition section stowed position, said movable first partition section configured to maintain partition sight-blocking and partition light-blocking capabilities throughout movement of the movable first partition section between the movable first partition section deployed position and the movable first partition section stowed position; and wherein said vehicle cabin partition assembly is located beneath and in communication with a section of vehicle cabin storage bin assembly.

17. The method of claim 16, further comprising:

attaching the vehicle cabin overhead storage bin door of the vehicle cabin overhead storage bin to the movable first partition section.

18. The method of claim 16, further comprising:

impeding passage of light between the vehicle cabin overhead storage bin door contour and the first partition section upper edge contour in the movable first partition section deployed position and in the movable first partition section stowed position.

19. The method of claim 16, further comprising:

activating the drive mechanism positioned within the second partition section cavity, said drive mechanism configured to raise and lower the movable first partition section relative to the second partition section in response to movement of the storage bin door.

20. The method of claim 16, wherein said drive mechanism incorporates a sensor, said sensor configured to sense application of a manual force on the storage bin door, the method further comprising:

sensing at the sensor a sensed manual force on the storage bin door; and triggering operation of the drive mechanism in response to the sensed manual force on the storage bin door to assist opening and closing of the storage bin door.

* * * * *